US012666069B2

(12) United States Patent     (10) Patent No.: US 12,666,069 B2

Jang     (45) **Date of Patent: \*Jun. 23, 2026**

(54) METHOD AND APPARATUS FOR VIDEO ENCODING/DECODING USING IBC MODE, AND METHOD FOR TRANSMITTING BITSTREAM

(71) Applicant: Nokia Technologies Oy, Espoo (FI)

(72) Inventor: Hyeong Moon Jang, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,182

(22) Filed: Apr. 22, 2024

(65) Prior Publication Data

US 2024/0267550 A1     Aug. 8, 2024

Related U.S. Application Data

(63) Continuation of application No. 17/437,651, filed as application No. PCT/KR2020/003410 on Mar. 11, 2020, now Pat. No. 11,997,300.

(Continued)

(51) Int. Cl.
    *H04N 19/46*     (2014.01)
    *H04N 19/107*     (2014.01)
    (Continued)

(52) U.S. Cl.
    CPC .......... *H04N 19/46* (2014.11); *H04N 19/107* (2014.11); *H04N 19/159* (2014.11); *H04N 19/176* (2014.11)

(58) Field of Classification Search
    CPC .... H04N 19/46; H04N 19/107; H04N 19/159; H04N 19/176; H04N 19/12; H04N 19/61;
    (Continued)

(56) References Cited

U.S. PATENT DOCUMENTS 9,628,799 B2    4/2017   Kim et al.
9,723,311 B2    8/2017   Kim et al.
(Continued)

FOREIGN PATENT DOCUMENTS

KR    10-2018-0030996 A    3/2018
RU        2604340 C2    12/2016
(Continued)

OTHER PUBLICATIONS

Benjamin Bross, et al., "Versatile Video Coding (Draft 4)" Joint Video Experts Team (JVET) of ITU-T SG 16 WP 3 and ISO/IEC JTC 1/SC 29/WG 11, 13th Meeting: Marrakech, MA, Jan. 9-18, 2019. JVET-M1001-v6.

(Continued)

*Primary Examiner* — Farzana Hossain
(74) *Attorney, Agent, or Firm* — ALSTON & BIRD LLP

(57) ABSTRACT

An image decoding method is disclosed. The image decoding method includes determining a prediction mode of a current block based on prediction mode information of the current block obtained from a bitstream, obtaining a transform coefficient block of the current block from the bitstream, dequantizing the transform coefficient to generate a dequantized transform coefficient block, determining a transform kernel for the dequantized transform coefficient block, and generating a residual block of the current block by performing inverse transform on the dequantized transform coefficient block using the transform kernel.

24 Claims, 19 Drawing Sheets

Related U.S. Application Data

(60) Provisional application No. 62/816,818, filed on Mar. 11, 2019.

(51) Int. Cl.
    H04N 19/159        (2014.01)
    H04N 19/176        (2014.01)

(58) Field of Classification Search
    CPC ...... H04N 19/18; H04N 19/625; H04N 19/70; H04N 19/124; H04N 19/103
    See application file for complete search history.

(56)                    References Cited

U.S. PATENT DOCUMENTS

| | | | |
|---|---|---|---|
| 9,860,559 | B2 | 1/2018 | Zhang et al. |
| 10,142,642 | B2 | 11/2018 | Zhang et al. |
| 10,419,759 | B2 | 9/2019 | Lee et al. |
| 2013/0195177 | A1 | 8/2013 | Hong et al. |
| 2016/0219290 | A1 | 7/2016 | Zhao et al. |
| 2016/0269732 | A1 | 9/2016 | Li et al. |
| 2016/0295219 | A1 | 10/2016 | Ye et al. |
| 2017/0244975 | A1 | 8/2017 | Huang et al. |
| 2018/0014026 | A1 | 1/2018 | Lim et al. |
| 2018/0152727 | A1 | 5/2018 | Chuang et al. |
| 2018/0288412 | A1 | 10/2018 | Oh et al. |
| 2018/0302631 | A1 | 10/2018 | Chiang et al. |
| 2018/0332289 | A1 | 11/2018 | Huang |
| 2020/0084454 | A1 | 3/2020 | Liu et al. |
| 2021/0360240 | A1 | 11/2021 | Lee |
| 2022/0303567 | A1* | 9/2022 | Jung .................... H04N 19/124 |

FOREIGN PATENT DOCUMENTS

| | | | |
|---|---|---|---|
| RU | 2016115055 | A | 10/2017 |
| WO | 2019/009584 | A1 | 1/2019 |
| WO | 2019/185883 | A1 | 10/2019 |

OTHER PUBLICATIONS

Chen et al., Algorithm description for Versatile Video Coding and Test Model 2 "VTM 2", JVET-K1002-v1, Joint Video Experts team "JVET" of ITU-T SG 16 WP 3 and ISO/IEC JTC 1/SC 29/WG 11, 11th Meeting: Ljunljana, SI, Jul. 2018. (Year: 2018).

Decision of Grant for Russian Application No. 2022133873/07(073735) dated Feb. 13, 2023, 27 pages.

Decision on Grant for Russian Application No. 2021129358/07(062268) dated Nov. 1, 2022, 22 pages.

Decision on Grant for Russian Application No. 2022114318/07(029924) dated Mar. 1, 2023, 19 pages.

First Examination Report for Indian Application No. 202117045743 dated Mar. 7, 2022, 6 pages.

H. Jang et al., "Adaptive NSST Kernel Size Selection", Joint Video Exploration Team (JVET) of ITU-T SG 16 WP 3 and ISO/IEC JTC 1/SC 29/WG 11, Jan. 12-20, 2017, JVET-E0047.

Intimation of Grant for Indian Application No. 202117045743 dated Jan. 3, 2024, 1 page.

IPEA/409—International Preliminary Report on Patentability Mailed on Sep. 23, 2021 for WO Application No. PCT/KR20/003410, 11 page(s).

JVET-M0292: Koo et al., Joint Video Experts Team (JVET) of ITU-T SG 16 WP 3 and ISO/IEC JTC 1/SC 29/WG11, 13th Meeting: Marrakech, MA, Jan. 9-18, 2019, "CE6: Reduced Secondary Transform (RST) (test 6.5.1)," LG Electronics Inc. (14 Pages).

JVET-M0304-v2: Lainema et al., Joint Video Experts Team (JVET) of ITU-T SG 16 WP 3 and ISO/IEC JTC 1/SC 29/WG 11, 13th Meeting: Marrakech, MA, Jan. 9-18, 2019, "CE6-related: 2-mode MTS with shape adaptive transform selection," Nokia (6 Pages).

JVET-M1002-v1: Chen et al., Joint Video Experts Team (JVET) of ITU-T SG 16 WP3 and ISO/IEC JTC 1/SC 29/WG 11, 13th Meeting, Marrakech, MA Jan. 9-18, 2019, Algorithm description for Versatile Video Coding and Test Model 4 (VTM 4) (63 Pages).

K. Choi et al., "CE6-related: Syntax clean-up related to MTS", Joint Video Experts Team (JVET) of ITU-T SG 16 WP 3 and ISO/IEC JTC 1/SC 29/WG 11, Jan. 9-18, 2019, JVET-M0201.

Non-Final Rejection Mailed on Sep. 29, 2023 for U.S. Appl. No. 17/437,651, 10 page(s).

Notice of Allowance and Fees Due (PTOL-85) Mailed on Jan. 24, 2024 for U.S. Appl. No. 17/437,651, 10 page (s).

Office Action for Korean Application No. 10-2021-7028743 dated Mar. 29, 2022, 14 pages.

Office Action for Korean Application No. 10-2021-7028743 dated Nov. 1, 2021, 24 pages.

Office Action for Korean Application No. 10-2022-7037410 dated Apr. 10, 2025, 9 pages.

Office Action for Russian Application No. 2021129358/07(062268) dated Jul. 1, 2022, 8 pages.

Office Action for Russian Application No. 2021129358/07(062268) dated Mar. 4, 2022, 18 pages.

Office Action for Russian Application No. 2022114318/07(029924) dated Oct. 13, 2022, 12 pages.

Office Action for Vietnamese Application No. 1-2021-06333 dated Aug. 21, 2023, 3 pages.

Outgoing—ISA/210—International Search Report Mailed on Jun. 26, 2020 for WO Application No. PCT/KR20/003410, 5 page(s).

Outgoing Written Opinion of the ISA Mailed on Jun. 26, 2020 for WO Application No. PCT/KR20/003410, 8 page (s).

Written Decision on Registration for Korean Application No. 10-2021-7028743 dated Jul. 25, 2022, 4 pages.

Written Decision on Registration for Korean Application No. 10-2022-7037410 dated Dec. 22, 2025, 5 pages.

First Examination Report for Indian Application No. 202218054340 dated Feb. 11, 2026, 8 pages.

* cited by examiner

FIG. 14

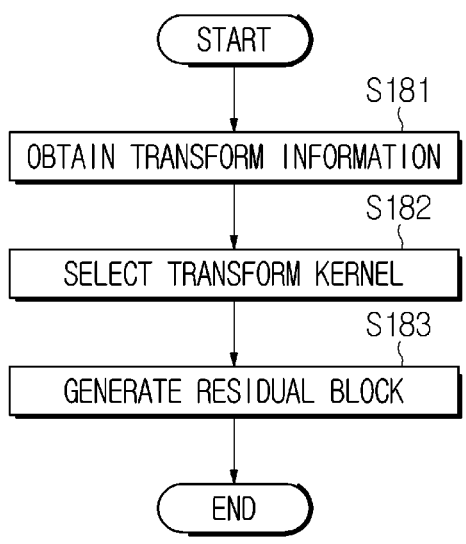

S181

OBTAIN TRANSFORM INFORMATION

S182

SELECT TRANSFORM KERNEL

S183

GENERATE RESIDUAL BLOCK

FIG. 15

| Transform Type | Basis function $T_i(j)$, $i, j = 0, 1, ..., N-1$ |
|---|---|
| DCT-II | $$T_i(j) = \omega_0 \cdot \sqrt{\frac{2}{N}} \cdot \cos\left(\frac{\pi \cdot i \cdot (2j + 1)}{2N}\right)$$ $$\text{where, } \omega_0 = \begin{cases} \sqrt{\frac{2}{N}} & i = 0 \\ 1 & i \neq 0 \end{cases}$$ |
| DCT-VIII | $$T_i(j) = \sqrt{\frac{4}{2N + 1}} \cdot \cos\left(\frac{\pi \cdot (2i + 1) \cdot (2j + 1)}{4N + 2}\right)$$ |
| DST-VII | $$T_i(j) = \sqrt{\frac{4}{2N + 1}} \cdot \sin\left(\frac{\pi \cdot (2i + 1) \cdot (j + 1)}{2N + 1}\right)$$ |

FIG. 18

| transform_unit( x0, y0, tbWidth, tbHeight, treeType, subTuIndex ) { | Descriptor |
|---|---|
| ... | ... |
| if( tu_cbf_luma[ x0 ][ y0 ]  && treeType != DUAL_TREE_CHROMA <br> && ( tbWidth <= 32 ) && ( tbHeight <= 32 ) <br> && ( IntraSubPartitionsSplit[ x0 ][ y0 ] = = ISP_NO_SPLIT ) && ( !cu_sbt_flag ) ) { | |
| if( transform_skip_enabled_flag && tbWidth <= MaxTsSize && tbHeight <= MaxTsSize ) | |
| transform_skip_flag[ x0 ][ y0 ] | ae(v) |
| if( (( CuPredMode[ x0 ][ y0 ] != MODE_INTRA && sps_explicit_mts_inter_enabled_flag ) <br>   \|\| ( CuPredMode[ x0 ][ y0 ] = = MODE_INTRA && sps_explicit_mts_intra_enabled_flag )) <br> && ( tbWidth <= 32 ) && ( tbHeight <= 32 ) && ( !transform_skip_flag[ x0 ][ y0 ] ) ) | |
| tu_mts_idx[ x0 ][ y0 ] | ae(v) |
| } | |
| if( tu_cbf_luma[ x0 ][ y0 ] ) | |
| residual_coding( x0, y0, Log2( tbWidth ), Log2( tbHeight ), 0 ) | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] ) | |
| residual_coding( xC, yC, Log2( wC ), Log2( hC ), 2 ) | |
| } | |

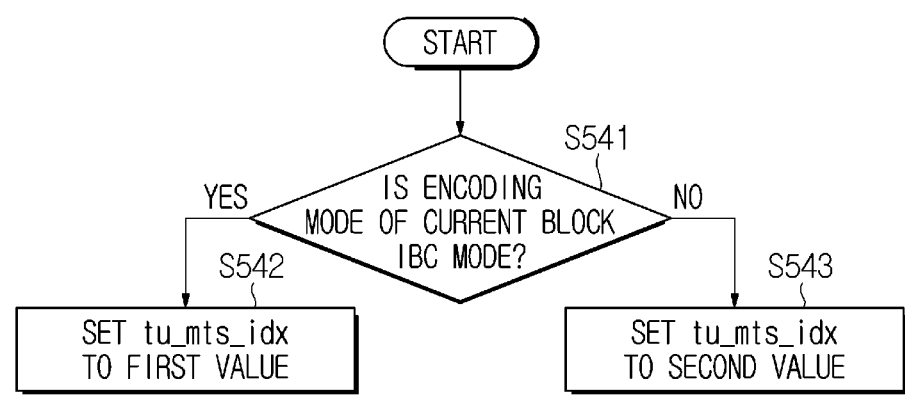

FIG. 22

| transform_unit( x0, y0, tbWidth, tbHeight, treeType, subTuIndex ) { | Descriptor |
|---|---|
| ... | ... |
| if( tu_cbf_luma[ x0 ][ y0 ]  &&  treeType != DUAL_TREE_CHROMA<br>&&  ( tbWidth <= 32 ) &&  ( tbHeight <= 32 )<br>&&  ( IntraSubPartitionsSplit[ x0 ][ y0 ]  == ISP_NO_SPLIT )  &&  ( !cu_sbt_flag ) ) { | |
| if( transform_skip_enabled_flag && tbWidth <= MaxTsSize && tbHeight <= MaxTsSize ) | |
| transform_skip_flag[ x0 ][ y0 ] | ae(v) |
| if( (( CuPredMode[ x0 ][ y0 ] == MODE_INTER && sps_explicit_mts_inter_enabled_flag )<br>|| ( CuPredMode[ x0 ][ y0 ] == MODE_INTRA && sps_explicit_mts_intra_enabled_flag ))<br>&&  ( tbWidth <= 32 )  &&  ( tbHeight <= 32 )  &&  ( !transform_skip_flag[ x0 ][ y0 ] ) ) | |
| tu_mts_idx[ x0 ][ y0 ] | ae(v) |
| } | |
| if( tu_cbf_luma[ x0 ][ y0 ] ) | |
| residual_coding( x0, y0, Log2( tbWidth ), Log2( tbHeight ), 0 ) | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] ) | |
| residual_coding( xC, yC, Log2( wC ), Log2( hC ), 2 ) | |
| } | |

400

METHOD AND APPARATUS FOR VIDEO ENCODING/DECODING USING IBC MODE, AND METHOD FOR TRANSMITTING BITSTREAM

CROSS-REFERENCE TO RELATED APPLICATIONS

This application is a Continuation of U.S. application Ser. No. 17/437,651 filed on Sep. 9, 2021, which is a National Stage filing under 35 U.S.C. 371 of International Application No. PCT/KR2020/003410, with an international filing date of Mar. 11, 2020, which claims the benefit of U.S. Provisional Application No. 62/816,818, filed on Mar. 11, 2019, all of which are incorporated by reference in their entirety herein.

TECHNICAL FIELD

The present disclosure relates to an image encoding/decoding method and apparatus, and a method of transmitting a bitstream, and, more particularly, to a method and apparatus for encoding/decoding an image using a transform kernel, and a method of transmitting a bitstream generated thereby.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide a method and apparatus for encoding/decoding an image by changing a method of selecting a transform kernel according to an encoding mode.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an embodiment for solving the above problems may include determining a prediction mode of a current block based on prediction mode information of the current block obtained from a bitstream, obtaining a transform coefficient block of the current block from the bitstream, dequantizing the transform coefficient to generate a dequantized transform coefficient block, determining a transform kernel for the dequantized transform coefficient block, and generating a residual block of the current block by performing inverse transform on the dequantized transform coefficient block using the transform kernel When the prediction mode of the current block is an inter prediction mode or an intra prediction mode, the transform kernel may be determined based on transform kernel index information obtained from the bitstream When the prediction mode of the current block is neither an inter prediction mode nor an intra prediction mode, the transform kernel index information may not be obtained from the bitstream and may be derived as a predetermined value.

When the prediction mode of the current block is an intra block copy (IBC) mode which refers to a block located in the same picture as the current block and decoded before the current block, the transform kernel index information may not be obtained from the bitstream and may be derived as a predetermined value.

When the prediction mode of the current block is an intra block copy (IBC) mode, the transform kernel index information may be derived as a value indicating any one transform kernel between DCT2 and DCT7.

The determining the transform kernel for the dequantized transform coefficient block may include deriving the transform kernel of the current block, based on first flag information specifying whether the transform kernel index information of the current block encoded in the intra prediction mode is able to be included in the bitstream and second flag information specifying whether the transform kernel index information of the current block encoded in the inter prediction mode is able to be included in the bitstream, and the first flag information and the second flag information may be obtained from the bitstream.

When both the first flag information and the second flag information have a first value specifying that the transform kernel index information is not included in the bitstream and the prediction mode of the current block is an intra block copy (IBC) mode, the transform kernel of the current block may be derived based on a width and height of the current block.

The transform kernel of the current block may include a horizontal transform kernel and a vertical transform kernel, the horizontal transform kernel of the current block may be determined based on whether the width of the current block is within a predetermined range and comparison between the width and height of the current block, and the vertical transform kernel of the current block may be determined based on whether the height of the current block is within a predetermined range and comparison between the width and height of the current block When at least one of the first flag information and the second flag information has a second value specifying that the transform kernel index information is able to be included in the bitstream and the prediction mode of the current block is an intra block copy (IBC) mode, the transform kernel of the current block may be derived based on the transform kernel index information, and the transform kernel index information may not be obtained from the bitstream and may be derived as a predetermined value.

When the transform kernel index information is not obtained from the bitstream, the transform kernel index information may be derived as a predetermined value. At this time, when the prediction mode of the current block is an intra block copy (IBC) mode which refers to a block located in the same picture as the current block and decoded before the current block, the transform kernel index information may be derived as a first value. When the prediction mode of the current block is a prediction mode other than the IBC mode, the transform kernel index information may be derived as a second value different from the first value.

An image decoding apparatus according to an embodiment for solving the above problems includes a memory; and at least one processor. The at least one processor may determine a prediction mode of a current block based on prediction mode information of the current block obtained from a bitstream, obtain a transform coefficient block of the current block from the bitstream, dequantize the transform coefficient to generate a dequantized transform coefficient block, determine a transform kernel for the dequantized transform coefficient block, and generate a residual block of the current block by performing inverse transform on the dequantized transform coefficient block using the transform kernel.

When the prediction mode of the current block is an inter prediction mode or an intra prediction mode, the transform kernel may be determined based on transform kernel index information obtained from the bitstream.

In addition, an image encoding method performed by an image encoding apparatus according to an embodiment for solving the above problems includes selecting a prediction mode of a current block, generating a prediction block for the current block based on the selected prediction mode, generating a residual block for the current block based on the prediction block, selecting a transform kernel for transforming the residual block based on the prediction mode, transforming the residual block based on the transform kernel to generate a transform coefficient block, quantizing the transform coefficient block to generate a quantized transform coefficient block, and encoding the quantized transform coefficient block to generate a bitstream.

When the prediction mode of the current block is an inter prediction mode or an intra prediction mode, transform kernel index information of the transform kernel used for the transforming the residual block may be included in the bitstream.

When the prediction mode of the current block is an intra block copy (IBC) mode, the transforming the residual block may be performed based on a predetermined transform kernel, and transform kernel index information of the predetermined transform kernel used for the transforming the residual block may not be included in the bitstream.

First flag information specifying whether the transform kernel index information of the current block encoded in the intra prediction mode is able to be included in the bitstream and second flag information specifying whether the transform kernel index information of the current block encoded in the inter prediction mode is able to be included in the bitstream may be included in the bitstream. At this time, when at least one of the first flag information and the second flag information has a second value specifying that the transform kernel index information is able to be included in the bitstream and the prediction mode of the current block is an intra block copy (IBC) mode, the transforming the residual block may be performed based on a predetermined transform kernel. Also, transform kernel index information of the predetermined transform kernel used for the transforming the residual block may not be included in the bitstream When both the first flag information and the second flag information have a first value specifying that the transform kernel index information is not included in the bitstream and the prediction mode of the current block is the intra block copy (IBC) mode, the transforming the residual block may be performed based on a predetermined transform kernel. At this time, the predetermined transform kernel may be derived based on a width and height of the current block. Also, transform kernel index information of the predetermined transform kernel used for the transforming the residual block may not be included in the bitstream.

In addition, an image encoding apparatus according to an embodiment for solving the above problems may transmit the bitstream generated as described above.

Advantageous Effects

According to the present disclosure, it is possible to provide an image encoding/decoding method and apparatus with improved encoding/decoding efficiency.

Also, according to the present disclosure, it is possible to provide a method and apparatus for encoding/decoding an image by changing a method of selecting a transform kernel according to an encoding mode.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIGS. 13 and 14 are flowcharts illustrating a method of performing transform and inverse transform of an encoding apparatus and a decoding apparatus according to an embodiment.

FIG. 15 is a view illustrating a transform kernel according to an embodiment.

FIGS. 16 to 18 are views illustrating an embodiment of performing encoding and decoding using a transform kernel by an encoding apparatus and a decoding apparatus.

FIGS. 19 to 24 are views illustrating another embodiment of performing encoding and decoding using a transform kernel by an encoding apparatus and a decoding apparatus.

MODE FOR INVENTION

Figure 1:
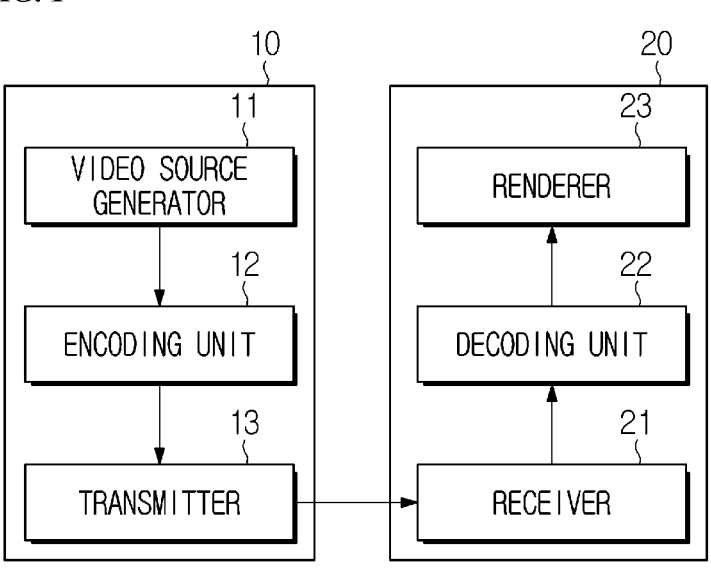
FIG. 1 is a view schematically illustrating a video coding system according to an embodiment.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

Hereinafter, the present disclosure discloses video/image coding technology. An encoding/decoding method disclosed in the present disclosure and embodiments thereof are applicable to methods disclosed in the versatile video coding (VVC) standard or next-generation video/image coding standard.

The present disclosure provides various embodiments related to video/image coding and, unless otherwise stated, the embodiments may be performed in combination with each other.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to an embodiment. The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
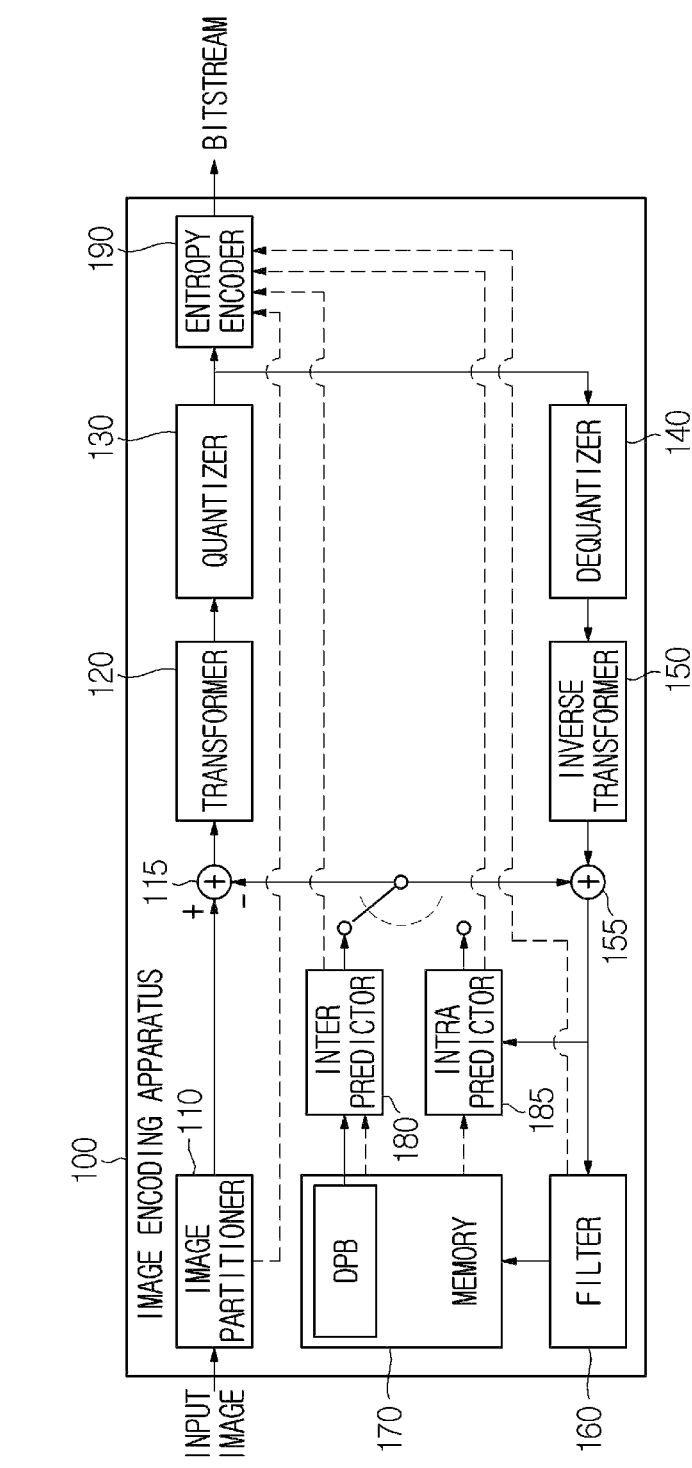
FIG. 2 is a view schematically illustrating an image encoding apparatus according to an embodiment.

FIG. 2 is a view schematically showing an image encoding apparatus according to an embodiment. As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. Alternatively, a binary tree structure may be applied first. The coding procedure according to the present disclosure may be performed based on the final coding unit that is no longer partitioned. In this case, based on coding efficiency according to image characteristics, the largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
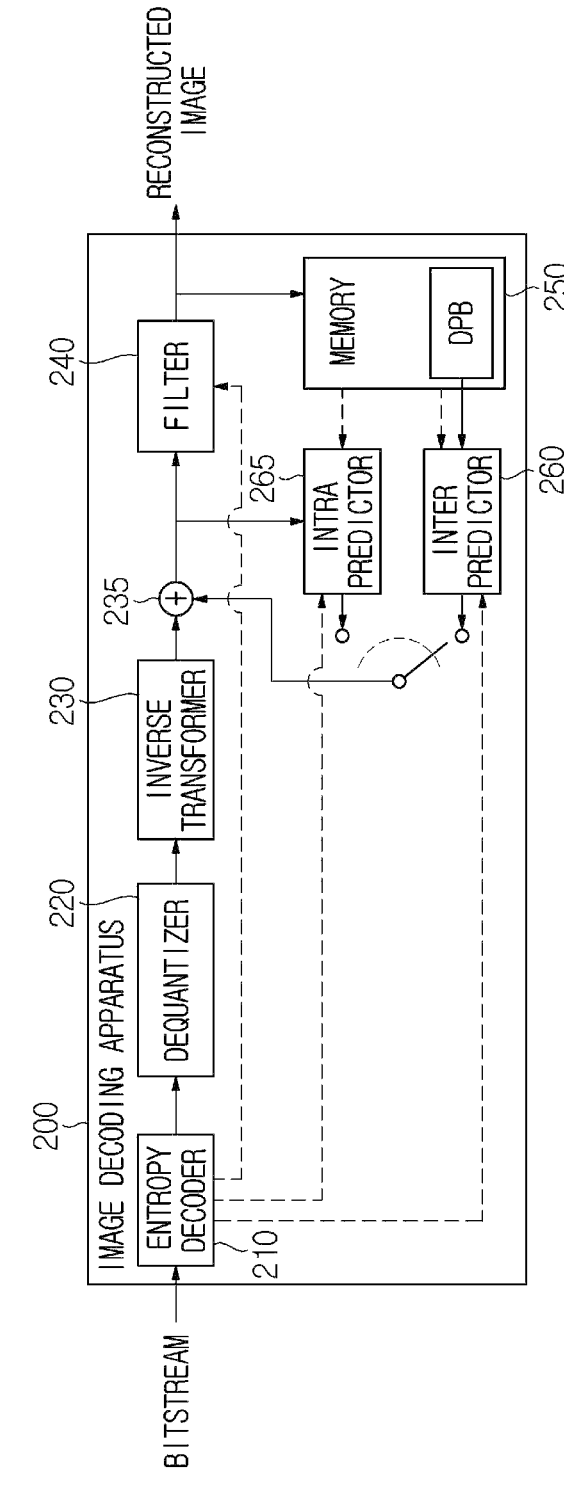
FIG. 3 is a view schematically illustrating an image decoding apparatus according to an embodiment.

FIG. 3 is a view schematically showing an image decoding apparatus according to an embodiment. As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

For example, the prediction unit may apply intra prediction or inter prediction or simultaneously apply intra prediction and inter prediction, for prediction of one block. This may be referred to as combined inter and intra prediction (CIIP). In addition, the prediction unit may perform intra block copy (IBC) for prediction of a block. Intra block copy may be used to code content image/video such as game, such as screen content coding (SCC). IBC may be performed similar to inter prediction in that prediction is performed in a current picture but a reference block is derived from the current picture. That is, IBC may use at least one of inter prediction techniques described in the present document.

The intra prediction unit 265 may predict the current block with reference to the samples in the current picture. The description of the intra prediction unit 185 is equally applied to the intra prediction unit 265. The referenced samples may be located in the vicinity (neighbor) of or apart from the current block. In intra prediction, prediction modes may include a plurality of non-directional modes and a plurality of direction modes. The intra prediction unit 265 may determine a prediction mode applied to the current block using the prediction mode applied to the neighbor block.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200, respectively, and embodiments described in the filter 240, the inter prediction unit 260, and the intra prediction unit 265 of the image decoding apparatus 200 are equally or correspondingly applied to the filter 160, the inter prediction unit 180 and the intra prediction unit 185 of the image encoding apparatus 100, respectively.

Overview of Intra Prediction

Hereinafter, an intra prediction method according to an embodiment will be described. Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples neighboring to the bottom-left, a sample adjacent to a top boundary of the current block and a total of 2×nW samples neighboring to the top-right, and one sample neighboring the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample neighboring the bottom-right of the current block. Meanwhile, when ISP which will be described later is applied, the neighboring reference samples may be derived in units of sub-partitions.

On the other hand, some of the neighboring reference samples of the current block have not yet been decoded or may not be available. In this case, a decoding apparatus may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode. In addition, the prediction sample may be generated through interpolation with the second neighboring sample and the first neighboring sample located in the opposite direction of the prediction direction of the intra prediction mode of the current block based on the prediction sample of the current block among the neighboring reference samples. The above-described case may be referred to as linear interpolation intra prediction (LIP). In addition, chroma prediction samples may be generated based on luma samples using a linear model. The above-described case may be called an LM mode. In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. The above-described case may be referred to as position dependent intra prediction (PDPC). In addition, a reference sample line with highest prediction accuracy may be selected from multiple neighboring reference sample lines of the current block to derive a prediction sample using a reference sample located in a prediction direction in the corresponding line, and, at this time, intra prediction encoding may be performed by indicating (signaling) the used reference sample line to the decoding apparatus. The above-described case may be referred to as multi-reference line (MRL) intra prediction or MRL based intra prediction. In addition, the current block may be divided into vertical or horizontal sub-partitions to perform intra prediction based on the same intra prediction mode, and neighboring reference samples may be derived and used in units of sub-partitions. That is, in this case, the intra prediction mode for the current block is equally applied to the sub-partitions and the neighboring reference samples are derived and used in units of sub-partitions, thereby increasing intra prediction performance. Such a prediction method may be referred to as intra sub-partitions (ISP) or ISP based intra prediction. In addition, when a prediction direction based on the prediction sample indicates a space between neighboring reference samples, that is, when the prediction direction indicates a fractional sample position, the value of the prediction sample may be derived through interpolation of a plurality of reference samples located around the prediction direction (around the fractional sample position). The above-described intra prediction methods may be referred to as intra prediction type to be distinguished from the intra prediction mode. In addition, after a prediction signal for a sub-sampled pixel set of the current block is generated using reconstructed neighboring pixels located on the left and top of the current block, the generated prediction signal and the neighboring sample value may be interpolated in the vertical and horizontal directions to generate the prediction signal having an original size, thereby applying matrix-weighted intra prediction (MIP) for performing intra prediction of the current block.

The intra prediction type may be referred to as various terms such as intra prediction scheme or additional intra prediction mode. For example, the intra prediction type (or the additional intra prediction mode) may include at least one of LIP, PDPC, MRL, ISP or MIP. Information on the intra prediction type may be encoded by an encoding apparatus, included in a bitstream and signaled to a decoding apparatus. Information on the intra prediction type may be implemented in various forms such as flag information indicating whether to apply each intra prediction type or index information indicating one of several intra prediction types.

Meanwhile, if necessary, post-filtering may be performed with respect to the derived prediction sample. Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Hereinafter, a video/image encoding method based on intra prediction will be described. First, the encoding apparatus performs intra prediction with respect to a current block. The encoding apparatus may derive an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures. Meanwhile, when the below-described prediction sample filtering procedure is performed, an intra prediction unit 185 may further include a prediction sample filter. The encoding apparatus may determine a mode/type applied to the current block among a plurality of intra prediction modes/types. The encoding apparatus may compare rate-distortion (RD) costs for the intra prediction modes/types and determine an optimal intra prediction mode/type for the current block.

Meanwhile, the encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Next, the encoding apparatus may generate residual samples for the current block based on the prediction samples. The encoding apparatus may compare the prediction samples in the original samples of the current block based on phase and derive the residual samples.

Next, the encoding apparatus may encode image information including information on the intra prediction (prediction information) and residual information on the residual samples. The prediction information may include the intra prediction mode information and the intra prediction type information. The encoding apparatus may output the encoded image information in the form of a bitstream. The output bitstream may be transmitted to the decoding apparatus through a storage medium or a network.

The residual information may include residual coding syntax, which will be described later. The encoding apparatus may transform/quantize the residual samples and derive quantized transform coefficients. The residual information may include information on the quantized transform coefficients.

Meanwhile, as described above, the encoding apparatus may generate a reconstructed picture (including reconstructed samples and reconstructed blocks). To this end, the encoding apparatus may perform inverse quantize/inverse transform with respect to the quantized transform coefficients and derive (modified) residual samples. The reason for transforming/quantizing the residual samples and then performing inverse quantization/inverse transform is to derive the same residual samples as residual samples derived by the decoding apparatus as described above. The encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is applicable to the reconstructed picture.

Hereinafter, a video/image encoding method based on intra prediction will be described. The decoding apparatus may perform operation corresponding to operation performed by the encoding apparatus.

First, the decoding apparatus may derive an intra prediction mode/type for the current block based on the received prediction information (intra prediction mode/type information). The decoding apparatus may derive neighboring reference samples of the current block. The decoding apparatus may generate prediction samples in the current block based on the intra prediction mode/type and the neighboring reference samples. In this case, the decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The decoding apparatus may generate residual samples for the current block based on the received residual information. The decoding apparatus may generate reconstructed samples for the current block based on the prediction samples and the residual samples and derive a reconstructed block including the reconstructed samples. Based on the reconstructed block, the reconstructed picture for the current picture may be generated. An in-loop filtering procedure is further applicable to the reconstructed picture.

The intra prediction mode information may include, for example, flag information (e.g., intra_luma_mpm_flag) indicating whether a most probable mode (MPM) or a remaining mode is applied to the current block, and, when the MPM is applied to the current block, the prediction mode information may further include index information (e.g., intra_luma_mpm_idx) indicating one of the intra prediction mode candidates (MPM candidates). The intra prediction mode candidates (MPM candidates) may configure an MPM candidate list or an MPM list. For example, the MPM candidate list may include an intra prediction mode of a neighboring block or a preset base intra prediction mode. In addition, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether to apply the MRL to the current block and, if applied, which reference sample line is used, ISP flag information (e.g., intra_subpartitions_mode_flag) indicating whether to apply the ISP to the current block, ISP type information (e.g., intra_subpartitions_split_flag) indicating the splitting type of the sub-partitions when applying the ISP, flag information indicating whether to apply PDPC or flag information indicating whether to apply LIP.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC, CAVLC) based on a truncated (rice) binary code.

Figure 4:
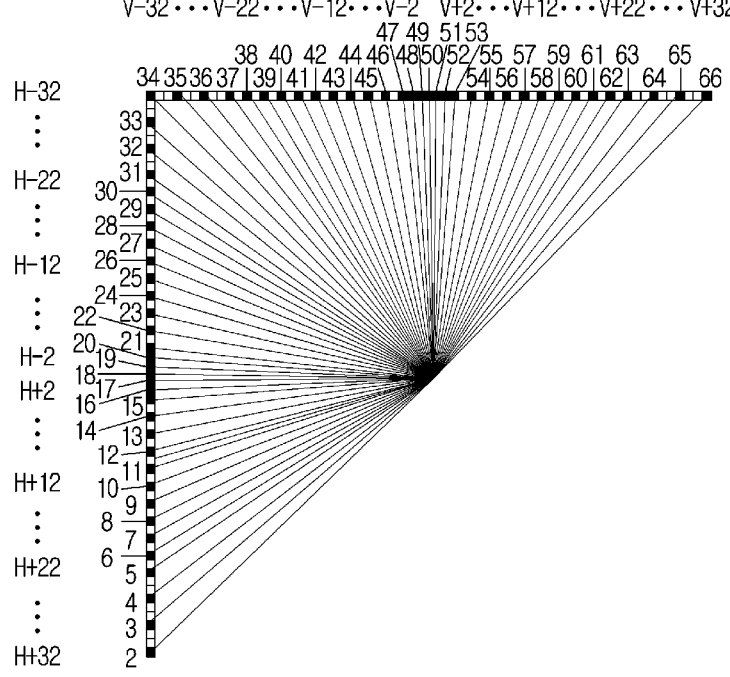
FIGS. 4 to 11 are views illustrating an encoding mode according to an embodiment.

Hereinafter, the intra prediction mode will be in greater detail. FIG. 4 shows an intra prediction direction according to an embodiment. In order to capture any edge direction presented in natural video, as shown in FIG. 4, the intra prediction mode may include two non-directional intra prediction modes and 65 directional intra prediction modes. The non-directional intra prediction modes may include a planar intra prediction mode and a DC intra prediction mode, and the directional intra prediction modes may include second to $66^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof are considered for LM parameter derivation and may be applied only to a chroma component. For example, the intra prediction mode may be indexed as shown in the following table.

TABLE 1

| Intra prediction mode | Associated name |
|---|---|
| 0 | INTRA_PLANAR |
| 1 | INTRA_DC |

TABLE 1-continued

| Intra prediction mode | Associated name |
| --- | --- |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Figure 5:
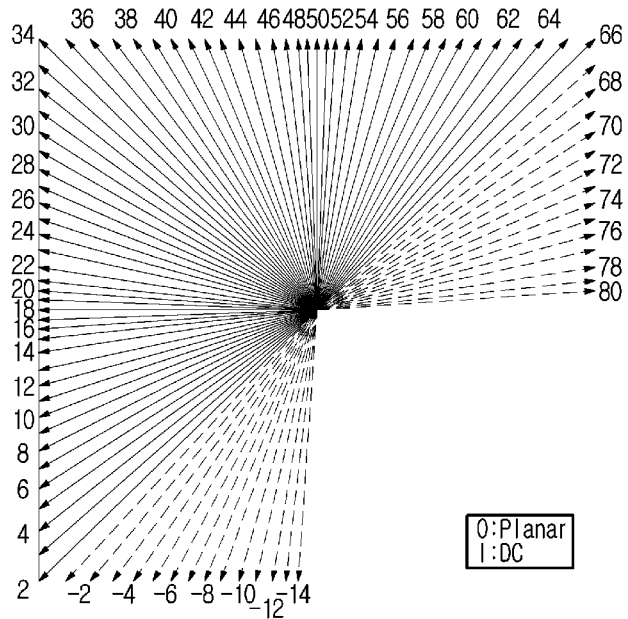

FIG. 5 shows an intra prediction direction according to another embodiment. Here, a dotted-line direction shows a wide angle mode applied only to a non-square block. As shown in FIG. 5, in order to capture any edge direction presented in natural video, the intra prediction mode according to an embodiment may include two non-directional intra prediction modes and 93 directional intra prediction modes. The non-directional intra prediction modes may include a planar prediction mode and a DC prediction mode, and the directional intra prediction modes may include second to $80^{th}$ and $-1^{st}$ to $-14^{th}$ intra prediction modes, as denoted by arrow of FIG. 5. The planar prediction mode may be denoted by INTRA_PLANAR, and the DC prediction mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80.

Meanwhile, the intra prediction type (or the additional intra prediction mode) may include at least one of LIP, PDPC, MRL, ISP or MIP. The intra prediction type may be indicated based on intra prediction type information, and the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether to apply the MRL the current block and, if applied, which reference sample line is used, ISP flag information (e.g., intra_subpartitions_mode_flag) indicating whether to apply the ISP to the current block, ISP type information (e.g., intra_subpartitions_split_flag) indicating the splitting type of the sub-partitions when applying the ISP, flag information indicating whether to apply PDPC, flag information indicating whether to apply LIP or MIP flag information indicating whether to apply MIP.

Overview of Inter Prediction

Hereinafter, an inter prediction method according to an embodiment will be described. The prediction unit of an encoding apparatus and a decoding apparatus may perform inter prediction in units of blocks to derive a prediction sample. Inter prediction may mean prediction derived in a manner that is dependent on data elements (e.g., sample values, motion information, etc.) of picture(s) other than a current picture. When inter prediction applies to the current block, a predicted block (prediction sample array) for the current block may be derived based on a reference block (reference sample array) specified by a motion vector on a reference picture indiated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU), and the reference picture including the temporal neighboring block may be referred to as a collocated picture (colPic). For example, a motion information candidate list may be constructed based on the neighboring blocks of the current block, and flag or index information indicating which candidate is selected (used) may be signaled in order to derive the motion vector of the current block and/or the reference picture index. Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference.

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may indicate a motion vector associated with a reference picture list L0 (L0) and the L1 motion vector may indicate a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 6:
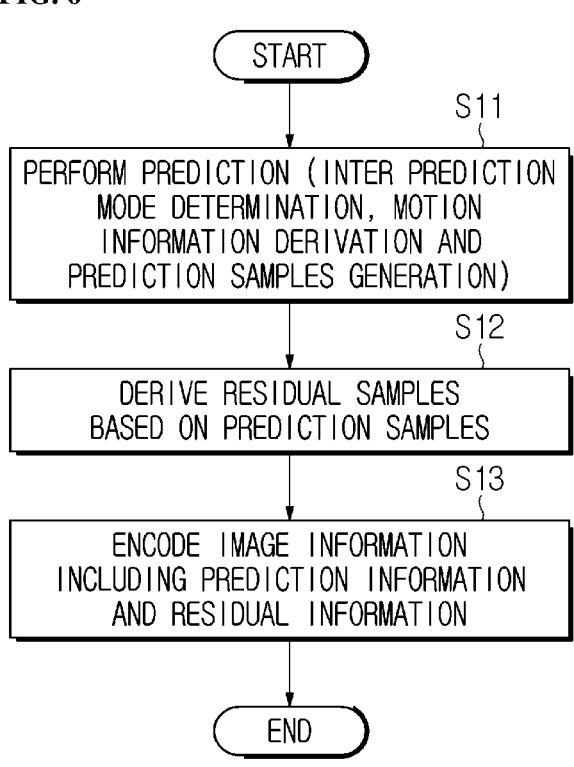
Figure 7:
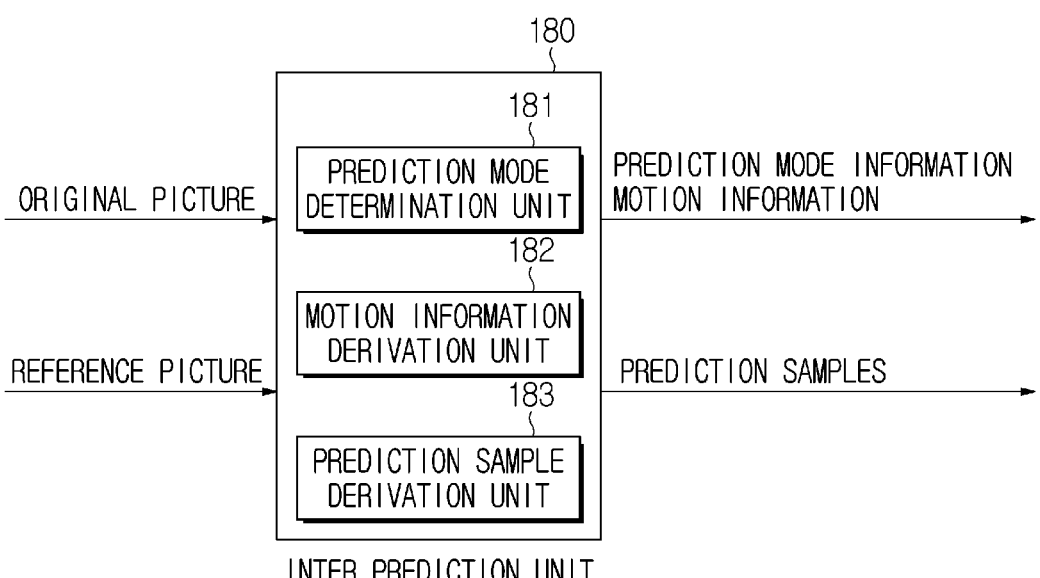

Hereinafter, a video/image encoding procedure based on inter prediction and an inter prediction unit in an encoding apparatus will be described with reference to FIGS. 6 and 7.

First, the encoding apparatus may perform inter prediction with respect to a current block (S11). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, the inter prediction unit 180 of the encoding apparatus may include a prediction mode determination unit 181, a motion information derivation unit 182 and a prediction sample derivation unit 183, and the prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The encoding apparatus may determine a mode applying to the current block among various prediction modes. The encoding apparatus may compare RD costs for the various prediction modes and determine an optimal prediction mode of the current block.

For example, when a skip mode or a merge mode applies to the current block, the encoding apparatus may construct a merge candidate list and derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when an (A)MVP mode applies to the current block, the encoding apparatus may construct an (A)mvp candidate list and derive a motion vector of an mvp candidate selected from among mvp candidates included in the (a)MVP candidate list. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, information on the MVD may be signaled to the decoding apparatus. In addition, when applying the (A)MVP mode, the value of the reference picture index may be constructed as reference picture index information and separately signaled to the decoding apparatus.

The encoding apparatus may derive residual samples based on the prediction samples (S12). The encoding apparatus may derive the residual samples through comparison between original samples of the current block and the prediction samples.

The encoding apparatus may encode image information including prediction information and residual information (S13). The encoding apparatus may output the encoded image information in the form of a bitstream. The prediction information may include prediction mode information (e.g., skip flag, merge flag or mode index, etc.) and information on motion information as information related to the prediction procedure. The information on the motion information may include candidate selection information (e.g., merge index, mvp flag or mvp index) which is information for deriving a motion vector. In addition, the information on the motion information may include information on the above-described MVD and/or reference picture index information. In addition, the information on the motion information may include information indicating whether to apply L0 prediction, L1 prediction or bi prediction. The residual information is information on the residual samples. The residual information may include information on quantized transform coefficients for the residual samples.

The output bitstream may be stored in a (digital) storage medium and transmitted to the decoding apparatus or may be transmitted to the decoding apparatus via a network.

As described above, the encoding apparatus may generate a reconstructed picture (including reconstructed samples and a reconstructed block) based on the reference samples and the residual samples. This is for the encoding apparatus to derive the same prediction result as that performed by the decoding apparatus, thereby increasing coding efficiency. Accordingly, the encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 8:
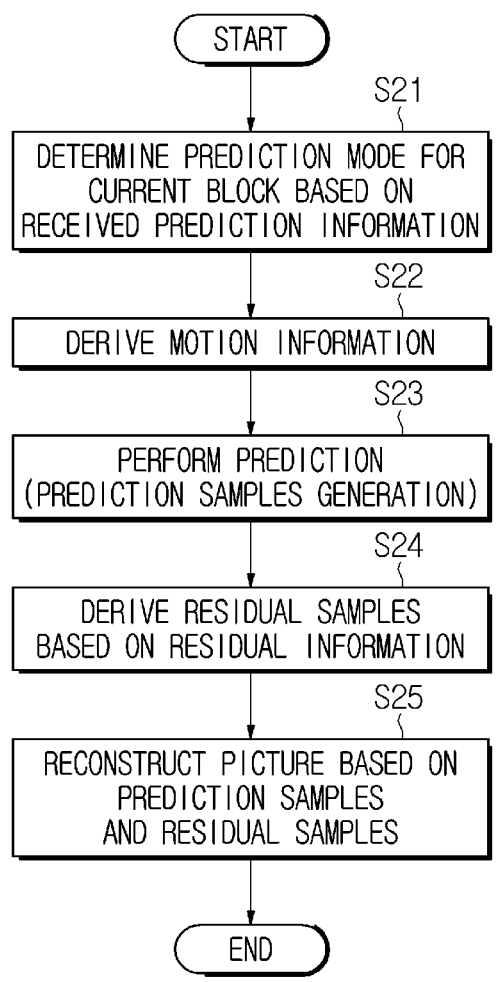
Figure 9:
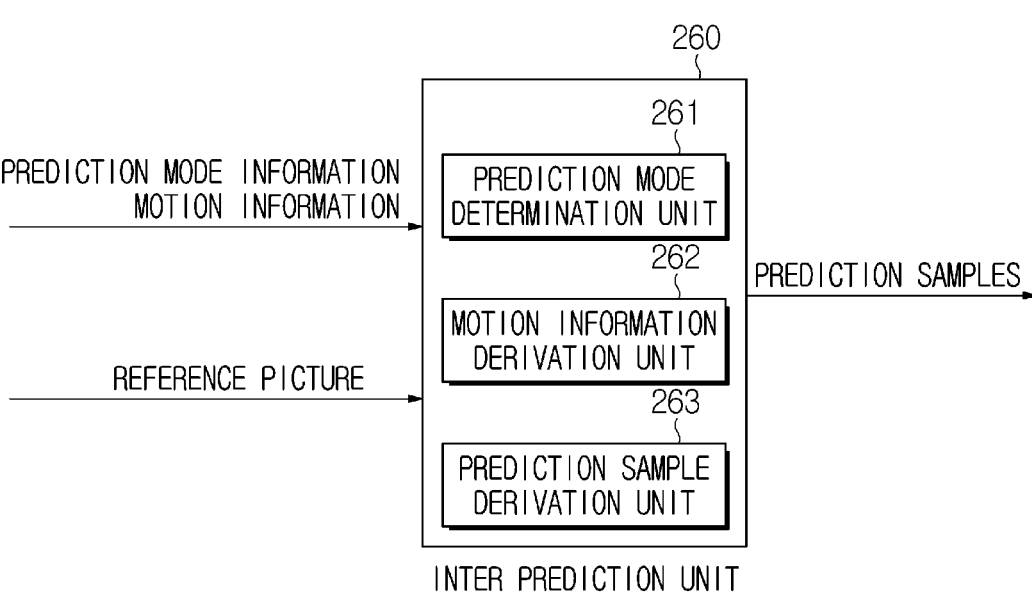

Hereinafter, a video/image decoding procedure based on inter prediction and an inter prediction unit in a decoding apparatus will be described with reference to FIGS. 8 and 9. The decoding apparatus may perform operation corresponding to operation performed by the encoding apparatus. The decoding apparatus may perform prediction with respect to a current block based on received prediction information and derive prediction samples.

Specifically, the decoding apparatus may determine the prediction mode of the current block based on the received prediction information (S21). The image decoding apparatus may determine which inter prediction mode applies to the current block based on the prediction mode information in the prediction information.

For example, it may be determined whether the merge mode or the (A)MVP mode applies to the current block based on the merge flag. Alternatively, one of various inter prediction mode candidates may be selected based on the mode index. The inter prediction mode candidates may include a skip mode, a merge mode and/or an (A)MVP mode or may include various inter prediction modes which will be described below.

The decoding apparatus may derive the motion information of the current block based on the determined inter prediction mode (S22). For example, when the skip mode or the merge mode applies to the current block, the decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. The motion information of the selected merge candidate may be used as the motion information of the current block.

As another example, when the (A)MVP mode applies to the current block, the decoding apparatus may construct an (A)MVP candidate list and use the motion vector of an mvp candidate selected from among mvp candidates included in the (A)MVP candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

Meanwhile, as described below, the motion information of the current block may be derived without candidate list construction and, in this case, the motion information of the current block may be derived according to the disclosed procedure in the below-described prediction mode. In this case, the above-described candidate list construction may be omitted.

The image decoding apparatus may generate prediction samples of the current block based on motion information of the current block (S23). In this case, the reference picture may be derived based on the reference picture index of the current block, and the prediction samples of the current block may be derived using the samples of the reference block indicated by the motion vector of the current block on the reference picture. In this case, as described below, some cases, a prediction sample filtering procedure may be further performed with respect to all or some of the prediction samples of the current block.

For example, the inter prediction unit 260 of the decoding apparatus may include a prediction mode determination unit 261, a motion information derivation unit 262 and a prediction sample derivation unit 263, and, the prediction mode determination unit 181 may determine the prediction mode of the current block based on the received prediction mode information, the motion information derivation unit 182 may derive the motion information (a motion vector and/or a reference picture index, etc.) of the current block based on the received motion information, and the prediction sample derivation unit 183 may derive the prediction samples of the current block.

The decoding apparatus may generate residual samples of the current block based the received residual information (S24). The decoding apparatus may generate the reconstructed samples of the current block based on the prediction samples and the residual samples and generate a reconstructed picture based on this (S25). Thereafter, an in-loop filtering procedure is applicable to the reconstructed picture.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the encoding apparatus and the decoding apparatus, as described above.

Overview of Intra Block Copy (IBC) Prediction

A decoding apparatus according to an embodiment may perform an intra block copy (IBC) prediction mode for decoding a current block using reference block information of a current picture in which a current block is located, in order to decode the current block which is a block to be decoded. For example, the decoding apparatus may decode the current block using decoding information of a reference block selected from a reconstructed area of the current picture. As only the reconstructed area in a predetermined area including a current CTU is used as a reference area, it is possible to reduce memory consumption and to reduce complexity of the decoding apparatus. Thus, an IBC mode may be implemented with a hardware configuration using an on-chip memory.

In the IBC mode, prediction is basically performed in the current picture, but may be performed similarly to inter prediction in that a reference block is derived in the current picture. For example, IBC may be performed using at least one of the above-described inter prediction techniques. For example, the decoding apparatus may use the above-described method of deriving the motion vector to perform the IBC mode. At least one of the above-described inter prediction techniques may be modified and used in consideration of IBC prediction as described below. In an embodiment, IBC may be referred to as current picture referencing (CPR) in that the current picture is referenced.

In order to perform the IBC mode, the encoding apparatus may derive an optimal motion vector for the current block (e.g., CU), by performing block matching. The derived motion vector may be signaled to the decoding apparatus through a bitstream using a method similar to motion vector signaling in the above-described inter prediction. The decoding apparatus may derive the reference block for the current block in the current picture through the signaled motion vector, and derive a prediction signal (predicted block or prediction samples) for the current block through this. Here, the block vector (or the motion vector) may represent displacement from the current block to the reference block located in an already reconstructed area in the current picture. Accordingly, the block vector (or the motion vector) may be referred to as a displacement vector. Hereinafter, in IBC, the motion vector may correspond to the block vector or the displacement vector. The motion vector of the current block may include a motion vector for a luma component (luma motion vector) or a motion vector for a chroma component (chroma motion vector). For example, the luma motion vector for an IBC-coded CU may be an integer sample unit (that is, integer precision). The chroma motion vector may also be clipped in units of integer samples. As described above, IBC may use at least one of inter prediction techniques and, for example, when IBC applies like AMVR, 1-pel and 4-pel motion vector precision may be switched.

At a CU level, the IBC mode may be signaled using a flag or may be signaled in an IBC AMVP mode or an IBC skip/merge mode as follows.

IBC skip/merge mode: A merge candidate index may be used to indicate which block vector is used to predict a current block in a list composed of neighboring candidate IBC coding blocks. The merge list may be composed of spatial, HMVP and pairwise candidates.

IBC AMVP mode: A block vector difference may be encoded in the same manner as encoding a motion vector difference. A block vector prediction method uses two candidates as a predictor. If encoding is performed in the IBC mode, one is for a left neighbor and the other is for a top neighbor. If at least one neighbor is not unavailable, a base block vector may be used as a predictor. A flag may be signaled to indicate a block vector predictor index.

Figure 10:
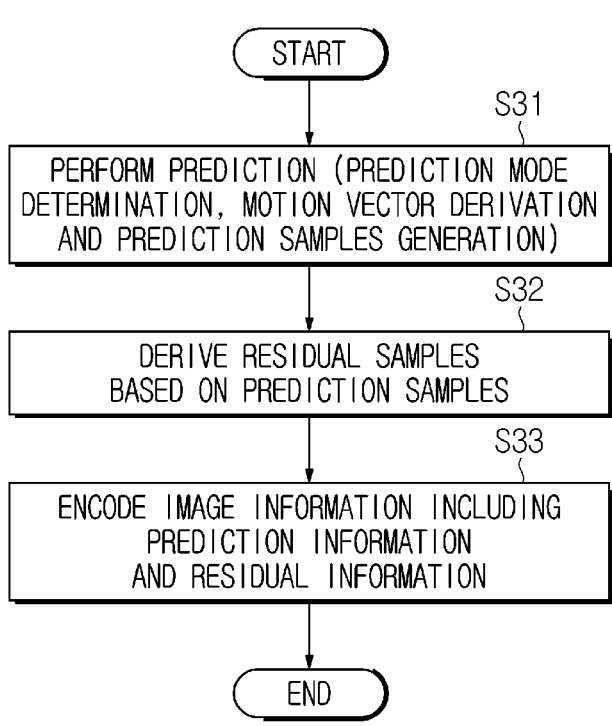

Hereinafter, a video/image encoding procedure based on an IBC mode and a prediction unit in an encoding apparatus will be described with reference to FIG. 10.

The encoding apparatus may perform IBC prediction (IBC based prediction) for the current block (S31). The encoding apparatus may derive a prediction mode and motion vector of the current block and generate prediction samples of the current block. The prediction mode may include at least one of the above-described inter prediction modes. Here, prediction mode determination, motion vector derivation and prediction samples generation procedures may be simultaneously performed or any one procedure may be performed before the other procedures. For example, the prediction unit of the image encoding apparatus may include a prediction mode determination unit, a motion vector derivation unit and a prediction sample derivation unit. The prediction mode determination unit may determine the prediction mode of the current block, the motion vector derivation unit may derives the motion vector of the current block, and the prediction sample derivation unit may derive the prediction samples of the current block. For example, the prediction unit of the encoding apparatus may search for a block similar to the current block in a reconstructed area (or a certain area (search area) of the reconstructed area) of a current picture through block matching (BM) and derive a reference block whose difference from the current block is equal to or less than a certain criterion or a minimum. A motion vector may be derived based on a displacement difference between the reference block and the current block. The encoding apparatus may determine a mode applying to the current block among various prediction modes. The encoding apparatus may compare RD costs based on the various prediction modes and determine an optimal prediction mode for the current block.

For example, when applying a skip mode or a merge mode to the current block, the encoding apparatus may construct the above-described merge candidate list and derive a reference block whose difference from the current block is equal to or less than a certain criterion or a minimum among reference blocks indicated by the merge candidates included in the merge candidate list. In this case, a merge candidate associated with the derived reference block may be selected and merge index information indicating the selected merge candidate may be generated and signaled to the decoding apparatus. Using the motion vector of the selected merge candidate, the motion vector of the current block may be derived.

As another example, when applying an (A)MVP mode to the current block, the encoding apparatus may construct the above-described (A)MVP candidate list and use the motion vector of the mvp candidate selected from among the mvp candidates included in the (A)MVP candidate list as the mvp of the current block. In this case, for example, a motion vector indicating a reference block derived by the above-described motion estimation may be used as the motion vector of the current block, and an mvp candidate having a smallest difference from the motion vector of the current block among the mvp candidates may become the selected mvp candidate. A motion vector difference (MVD) which is obtained by subtracting the mvp from the motion vector of the current block may be derived. In this case, the information on the MVD may be signaled to the decoding apparatus.

The encoding apparatus may derive residual samples based on the prediction samples (S32). The image encoding apparatus may derive the residual samples through comparison between the original samples of the current block and the prediction samples.

The encoding apparatus may encode image information including prediction information and residual information (S33). The encoding apparatus may output the encoded image information in the form of a bitstream. The prediction information may include prediction mode information (e.g., skip flag, merge flag or mode index) and information on a motion vector as information related to the prediction procedure. The information on the motion vector may include candidate selection information (e.g., merge index, mvp flag or mvp index) which is information for deriving the motion vector. In addition, the information on the motion vector may include information on the above-described MVD. In addition, the information on the motion vector may include information indicating whether to apply L0 prediction, L1 prediction or bi prediction. The residual information is information on the residual samples. The residual information may include information on the quantized transform coefficients for the residual samples.

The output bitstream may be stored in a (digital) storage medium and transmitted to the decoding apparatus or may be transmitted to the decoding apparatus through a network.

Meanwhile, as described above, the encoding apparatus may generate a reconstructed picture (including reconstructed samples and a reconstructed block) based on the reference samples and the residual samples. This is for the encoding apparatus to derive the same prediction result as that performed by the decoding apparatus, thereby increasing coding efficiency. Accordingly, the encoding apparatus may store the reconstructed picture (or reconstructed samples and reconstructed block) in a memory and use the same as a reference picture for inter prediction. An in-loop filtering procedure is further applicable to the reconstructed picture, as described above.

Figure 11:
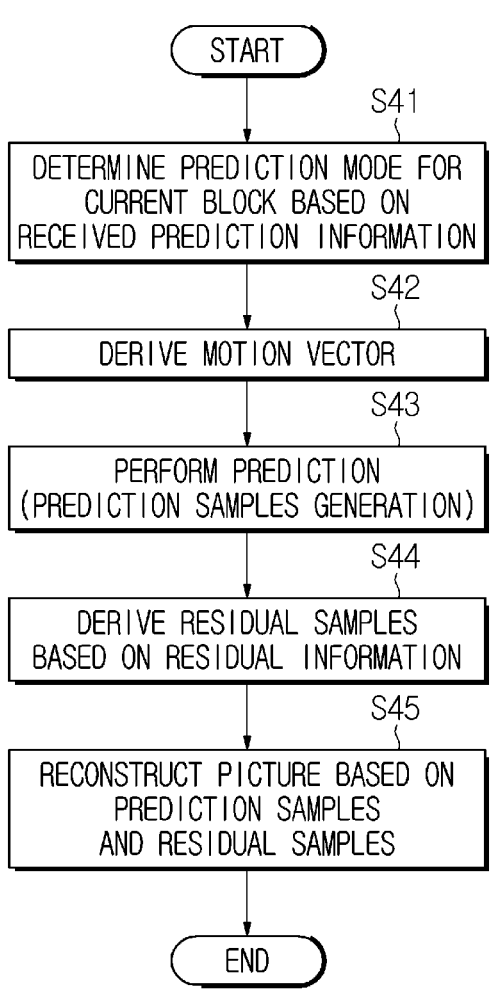

Hereinafter, a video/image decoding procedure based on IBC and a prediction unit in the decoding apparatus will be described with reference to FIG. 11. The decoding apparatus may perform operation corresponding to operation performed by the encoding apparatus. The decoding apparatus may perform IBC prediction with respect to a current block based on received prediction information and derive prediction samples.

Specifically, the decoding apparatus may determine the prediction mode for the current block based on the received prediction information (S41). The decoding apparatus may determine which inter prediction mode applies to the current block based on the prediction mode information in the prediction information.

For example, it may be determined whether to apply the merge node or (A)MVP mode to the current block based on the merge flag. Alternatively, one of various inter prediction mode candidates may be selected based on the mode index. The inter prediction mode candidates may include a skip mode, a merge mode and/or an (A)MVP mode or may include the below-described various inter prediction modes.

The encoding apparatus may derive the motion vector of the current block based on the determined prediction mode (S42). For example, when applying the skip mode or the merge mode to the current block, the decoding apparatus may construct the above-described merge candidate list and select one of the merge modes included in the merge candidate list. The selection may be performed based on the above-described candidate selection information (merge index). The motion vector of the current block may be derived using the motion vector of the selected merge candidate. The motion vector of the selected merge candidate may be used as the motion vector of the current block.

As another example, when applying the (A)MVP mode to the current block, the decoding apparatus may construct an (A)MVP candidate list and use the motion vector of the mvp candidate selected from among the mvp candidates included in the (A)MVP candidate list as the mvp of the current block. The selection may be performed based on the above-described candidate selection information (mvp flag or mvp index). In this case, the MVD of the current block may be derived based on information on the MVD, and the motion vector of the current block may be derived based on the mvp and MVD of the current block.

Meanwhile, as described above, the motion information of the current block may be derived without candidate list construction and, in this case, the motion information of the current block may be derived according to the disclosed procedure in the corresponding prediction mode. In this case, the above-described candidate list construction may be omitted.

The decoding apparatus may generate prediction samples of the current block based on the motion vector of the current block (S43). The prediction samples of the current block may be derived using the samples of the reference block indicated by the motion vector of the current block on the current picture. In this case, a prediction sample filtering procedure for all or some of the prediction samples of the current block may be further performed.

For example, the prediction unit of the decoding apparatus may include a prediction mode determination unit, a motion vector derivation unit and a prediction sample derivation unit, the prediction mode determination unit may determine the prediction mode for the current block based on the received prediction mode information, the motion vector derivation unit may derive the motion vector of the current block based on the received information on the motion vector, and the prediction sample derivation unit may derive the prediction samples of the current block.

The decoding apparatus may generate residual samples of the current block based on the received residual information (S44). The image decoding apparatus may generate reconstructed samples for the current block based on the prediction samples and the residual samples, and generate a reconstructed picture based on this (S45). Thereafter, an in-loop filtering procedure is further applicable to the reconstructed picture.

Overview of Transform Information Signaling

Figure 12:
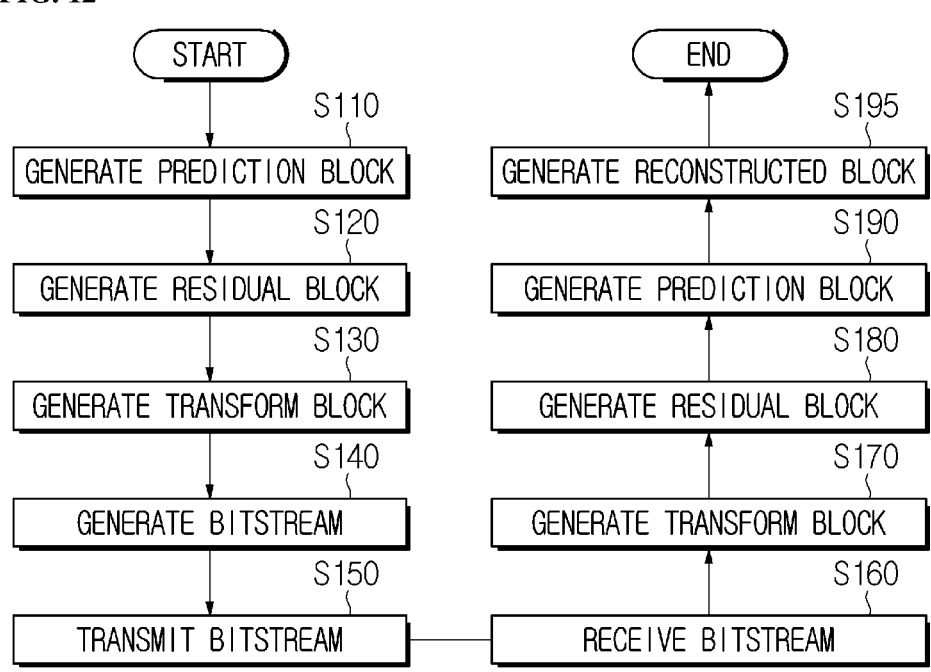
FIG. 12 is a flowchart illustrating an encoding and decoding method using transform and inverse transform of an encoding apparatus and a decoding apparatus according to an embodiment.

In an embodiment, information for transforming/inversely transforming a current block may be signaled from an encoding apparatus to a decoding apparatus through a bitstream. Referring to FIG. 12, as described above, the encoding apparatus may generate a prediction block which is a block of prediction samples predicted through inter, intra and IBC mode prediction (S110), and derive a residual block (residual samples) for a block to be encoded based on the prediction block (S120). The encoding apparatus may derive a transform block composed of quantized transform coefficients by applying transform and quantization to the derived residual block (S130). The encoding apparatus may generate prediction mode information indicating prediction modes (inter, intra and IBC modes) used to encode the current block, transform information used to derive the transform block and encoding information for quantized transform coefficients constructing the transform block as a bitstream (S140). Next, the encoding apparatus may transmit the generated bitstream to the decoding apparatus (S150).

The decoding apparatus may receive the bitstream (S160), and obtain prediction mode information, transform information and encoding information for the quantized transform coefficients from the bitstream. The decoding apparatus may decode the encoding information for the transform coefficients and derive a transform block composed of quantized transform coefficients (S170). The decoding apparatus may derive a residual block through dequantization/inverse transform based on the transform block (S180). Next, the decoding apparatus may generate a prediction block based on the prediction information obtained from the bitstream (S190). Next, the decoding apparatus may generate a reconstructed block of the current block based on the prediction block and the residual block (S195). Meanwhile, at least one of the quantization/dequantization and/or transform/inverse transform may be omitted.

The encoding apparatus and the decoding apparatus according to an embodiment may select a transform kernel to perform transform (inverse transform). The transform kernel may be referred to as various terms such as a transform matrix, a transform type or a transform function. The encoding apparatus may generate a transform block by transforming the residual block based on the selected transform kernel, and the decoding apparatus may generate a residual block by inversely transforming the transform block based on the selected transform kernel. The following equation shows an embodiment in which the decoding apparatus applies a transform matrix transMatrix[i][j] to generate residual block samples y[i] for a transform block x[j]. Here, j may have a value of 0 to nonZeroS−1. nonZeroS indicates a horizontal sample size of non-zero quantized transform coefficients. i may have a size of 0 to nTbS−1. nTbS indicates a horizontal sample size of residual samples.

$$y[i] = \sum_{j=0}^{nonZeroS-1} transMatrix[i][j] * x[j] \text{ with } i = 0 \ldots nTbS - 1$$

[Equation 1]

The transform kernel used when the decoding apparatus performs inverse transform may have an inverse relationship with respect to the transform kernel used when the encoding apparatus performs transform. For example, when the transform kernel is composed of a transform matrix, the transform matrix used when the decoding apparatus performs inverse transform may be an inverse matrix of the transform matrix used when the encoding apparatus performs transform. When the transform kernel is composed of a transform function, a transform function used when the decoding apparatus performs inverse transform may be an inverse function of the transform function used when the encoding apparatus performs transform.

Figure 13:
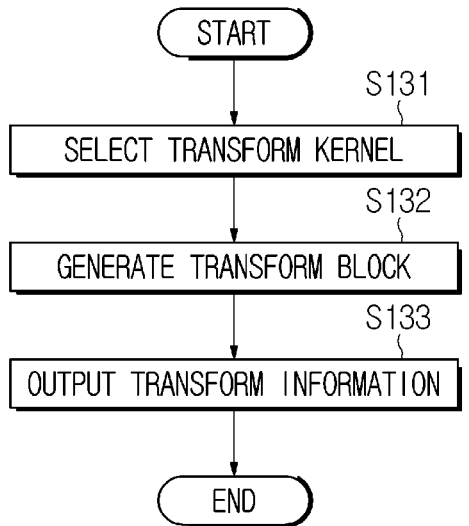

An encoding apparatus and a decoding apparatus according to an embodiment may perform multiple transform selection (MTS) for selecting a kernel for transforming (inversely transforming) a current block among a plurality of transform kernels. This will be described in greater detail with reference to FIGS. 13 and 14. The encoding apparatus or the decoding apparatus may select any one transform kernel from among a plurality of transform kernels to perform transform or inverse transform. In an embodiment, the encoding apparatus may apply a plurality of transform kernels to a residual block and then select a transform kernel with the highest transform efficiency as a transform kernel for transforming the residual block (S131). Here, the transform kernel with the highest transform efficiency may be selected by comparison of RD costs. In addition, the encoding apparatus may generate a transform block as a result of applying the selected transform kernel to the residual block (S132). Finally, the encoding apparatus may output transform information for signaling the transform kernel used for transform to the decoding apparatus and information on the transform block as a bitstream (S133). Here, the transform information may include at least one of information indicating whether MTS according to the prediction mode is performed, information indicating a kernel applied to the MTS or information indicating whether such information is included in the bitstream.

In response thereto, the decoding apparatus may obtain transform information and information on a transform block from a bitstream, in order to perform inverse transform of a transform block and generate a residual block corresponding thereto (S181). In addition, the decoding apparatus may select a transform kernel for inverse transform of a current transform block based on the transform information (S182). In addition, the decoding apparatus may generate a residual block for the current transform block using the selected transform kernel (S183).

As described above, since any one transform kernel is selected from among a plurality of transform kernels according to transform efficiency and is used, the encoding apparatus may signal information on the transform kernel used for transform to the decoding apparatus, and the decoding apparatus may perform inverse transform using a transform kernel corresponding to the transform kernel used for transform of the encoding apparatus.

Meanwhile, in order to perform MTS, the transform kernel may be determined by selecting some of a plurality of transform kernel sets. For example, the transform kernel set may be composed of a combination of a vertical transform kernel and a horizontal transform kernel. In addition, as index information for selecting a transform kernel set, MTS index information which is transform kernel index information may be used.

Accordingly, an encoding apparatus according to an embodiment may signal MTS index information to a decoding apparatus as information for enabling the decoding apparatus to select a transform kernel set. For example, MTS index information may be generated by the encoding apparatus and signaled to the decoding apparatus in order to indicate one of the transform kernel sets. In an embodiment, the transform kernel set may be signaled as index information indicating a vertical transform kernel and index information indicating a horizontal transform kernel. The following table shows an embodiment of a transform kernel set according to a value of MTS index information.

TABLE 2

| | tu_mts_idx[ x0 ][ y0 ] | | | | |
|---|---|---|---|---|---|
| | 0 | 1 | 2 | 3 | 4 |
| trTypeHor | 0 | 1 | 2 | 1 | 2 |
| trTypeVer | 0 | 1 | 1 | 2 | 2 |

Here, trTypeHor may indicate a horizontal transform kernel, and trTypeVer may indicate a vertical transform kernel. In an embodiment, a value 0 of trTypeHor and trTypeVer according to the above table may indicate DCT2, a value 1 of trTypeHor and trTypeVer may indicate DST7, and a value 2 of trTypeHor and trTypeVer may indicate DCT8. However, this is an example, and different DCTs or DSTs may be mapped to values indicated by trTypeHor and trTypeVer. FIG. 15 shows an example of basis functions for DCT2, DCT8 and DST7.

Embodiment 1

Figure 16:
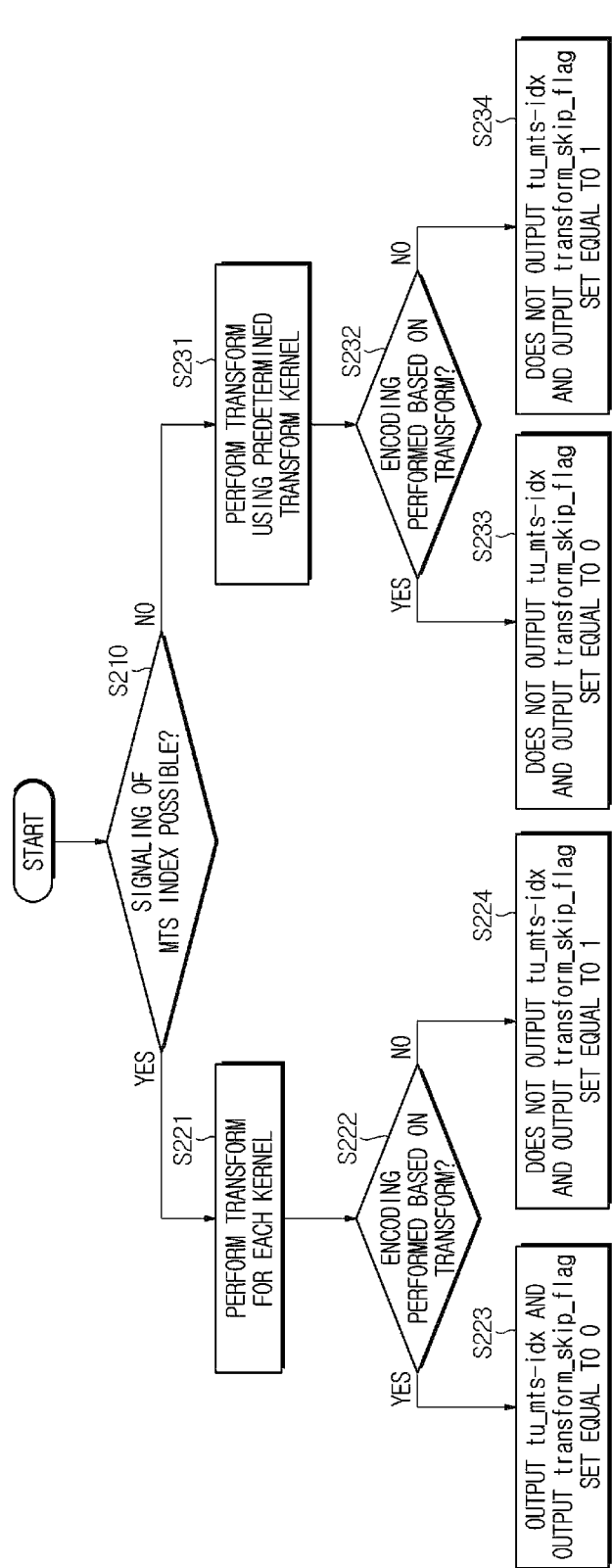

Hereinafter, MTS index signaling of an encoding apparatus according to an embodiment and an inverse transform process of a decoding apparatus accordingly will be described with reference to FIGS. 16 to 18. FIG. 16 is a flowchart illustrating a method of encoding a current block using MTS by an encoding apparatus according to an embodiment. The encoding apparatus according to an embodiment may determine whether signaling of an MTS index is performed through a bitstream to encode the current block (S210). For example, the encoding apparatus may determine that signaling of the MTS index is possible to encode the current block, when flag information included in a sequence parameter set (SPS) indicates whether signaling of the MTS index is possible. For example, the sequence parameter set may include first flag information indicating whether tu_mts_idx is able to be included in a bitstream when a current coding mode is an inter mode and second flag information indicating whether tu_mts_idx is able to be included in a bitstream when the current coding mode is an intra mode. Therefore, the encoding apparatus may determine whether signaling of the MTS index is possible according to the encoding mode of the current block.

Here, a first flag may be sps_explicit_mts_intra_enabled_flag which is a parameter indicating whether tu_mts_idx is present in intra coding unit syntax. For example, when tu_mts_idx is present in the intra coding unit syntax, sps_explicit_mts_intra_enabled_flag may have a value of 1. Meanwhile, when tu_mts_idx is not present in the intra coding unit syntax, sps_explicit_mts_intra_enabled_flag may have a value of 0.

A second flag may be sps_explicit_mts_inter_enabled_flag which is a parameter indicating whether tu_mts_idx is present in inter coding unit syntax. When tu_mts_idx is present in the inter coding unit syntax, sps_explicit_mts_intra_enabled_flag may have a value of 1. When tu_mts_idx is not present in inter coding unit syntax, sps_explicit_mts_intra_enabled_flag may have a value of 0.

Next, the encoding apparatus may perform transform of the current block for each of a plurality of transform kernels when signaling of the MTS index is possible (S221). For example, the encoding apparatus may generate a transform block by transforming a residual block for the current block for each of the plurality of kernels.

Next, the encoding apparatus may determine whether to apply transform to perform encoding of the current block, based on a result of performing transform of the current block for each of the plurality of kernels (S222). For example, the encoding apparatus may determine whether to apply transform to perform encoding, by comparing coding efficiency in the case where transform is not performed and the case where transform is performed for each transform kernel.

Next, when signaling of the MTS index is possible and the current block is encoded based on transform, the encoding apparatus outputs the MTS index of the transform kernel used for transform as the value of tu_mts_idx as the bitstream and output 0 as the value of transform_skip_flag which is a parameter indicating whether transform is skipped as the bitstream (S223). Therefore, the encoding apparatus may signal information on the transform kernel used for transform to the decoding apparatus.

Meanwhile, when the current block is not encoded based on transform, the encoding apparatus may not output the value of tu_mts_idx as the bitstream and may output 1 as the value of transform_skip_flag which is the parameter indicating whether transform is skipped as the bitstream (S224). Therefore, the encoding apparatus may signal, to the decoding apparatus, information indicating that transform of the current block is not performed and is skipped.

Referring to step S210 again, when signaling of the MTS index is not possible, the encoding apparatus may perform transform of the current block using a predetermined transform kernel (S231). For example, the encoding apparatus may generate a transform block by transforming a residual block for the current block using the predetermined transform kernel. For example, the encoding apparatus may use DCT2 as a horizontal transform kernel and use DCT2 as a vertical transform kernel. Alternatively, the encoding apparatus may use DST7 as a horizontal transform kernel and use DST7 as a vertical transform kernel. Alternatively, the encoding apparatus may use DCT8 as a horizontal transform kernel and use DCT8 as a vertical transform kernel.

Next, the encoding apparatus may determine whether to apply transform to perform encoding of the current block based on a result of performing transform of the current block using the predetermined transform kernel (S232). For example, the encoding apparatus may determine whether to apply transform to perform encoding, by comparing coding efficiency in the case where transform is not performed and the case where transform is performed.

Next, when the current block is encoded based on transform, the encoding apparatus may not output the value of tu_mts_idx as the bitstream and may output 0 as the value of transform_skip_flag which is the parameter indicating whether transform is skipped as the bitstream (S233). Therefore, the encoding apparatus may signal information on the transform kernel to the decoding apparatus, by causing the decoding apparatus to derive the information on the transform kernel used for transform.

Meanwhile, when the current block is not encoded based on transform, the encoding apparatus may not output the value of tu_mts_idx as the bitstream and may output 1 as the value of transform_skip_flag which is the parameter indicating whether transform is skipped as the bitstream (S234). Therefore, the encoding apparatus may signal, to the decoding apparatus, information indicating that transform of the current block is not performed and is skipped.

Figure 17:
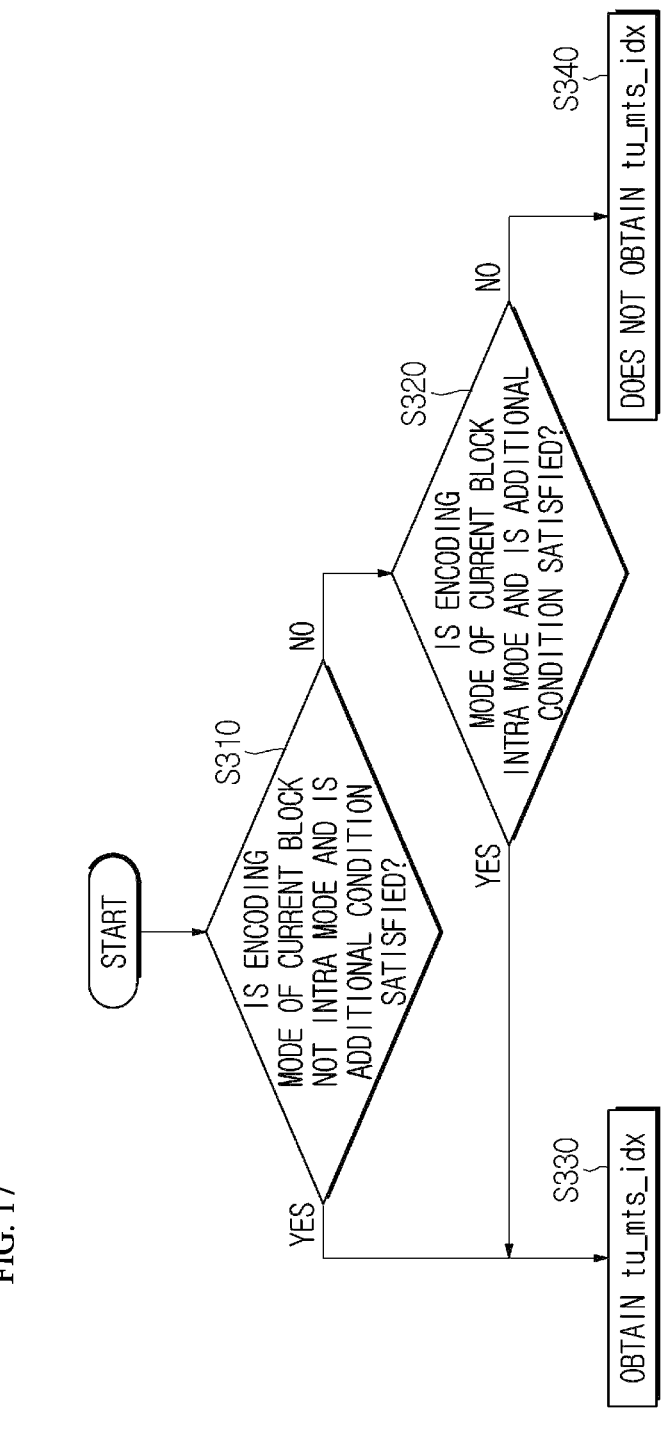

FIG. 17 illustrates a method of decoding a current block using MTS by a decoding apparatus according to an embodiment. The decoding apparatus according to an embodiment may determine whether the encoding mode of the current block is not an intra mode and an additional condition is satisfied (S310). Here, the additional condition may be whether a first flag indicates whether tu_mts_idx is included in the bitstream when the current coding mode is an inter mode. For example, when the encoding mode of the current block is not an intra mode and the first flag indicates whether tu_mts_idx is included in the bitstream when the current coding mode is an inter mode, the decoding apparatus may obtain tu_mts_idx from the bitstream (S330).

Otherwise, the decoding apparatus according to an embodiment determines whether the encoding mode of the current block is an intra mode and an additional condition is satisfied (S320). Here, the additional condition may be whether a second flag obtained from the bitstream indicates whether tu_mts_idx is included in the bitstream when the current coding mode is an intra mode. For example, when the encoding mode of the current block is an intra mode and the second flag indicates whether tu_mts_idx is included in the bitstream when the current coding mode is an intra mode, the decoding apparatus may obtain tu_mts_idx from the bitstream (S330).

Meanwhile, when the condition of step S320 is not satisfied, the decoding apparatus may not obtain tu_mts_idx of the current block (S340). In addition, the decoding apparatus may not obtain tu_mts_idx of the current block, when the value of transform_skip_flag obtained from the bitstream indicates that transform of the current block is not performed.

Here, the order of steps S210 and S320 may be changed. For example, the encoding apparatus may determine whether the encoding mode of the current block is an intra mode and the additional condition is satisfied (S320), and then may determine whether the encoding mode of the current block is an inter mode and the additional condition is satisfied (S310) according to the result.

The decoding apparatus may determine whether a predetermined transform kernel is used or the transform kernel is selected according to tu_mts_idx, in order to encoder the current block. For example, the decoding apparatus may determine that a predetermined transform kernel is used, when the value of sps_explicit_mts_intra_enabled_flag is 0, the value of sps_explicit_mts_inter_enabled_flag is 0 and the encoding mode of the current block is an intra mode. Meanwhile, when such conditions are not satisfied, the decoding apparatus may determine that the transform kernel is selected according to tu_mts_idx.

When the current block is decoded using the predetermined transform kernel, the decoding apparatus may generate a residual block of the current block by inversely transforming the transform block of the current block using the predetermined transform kernel regardless of the value of tu_mts_idx. For example, the decoding apparatus may use DCT2 as a horizontal transform kernel and use DCT2 as a vertical transform kernel. Alternatively, the decoding apparatus may use DST7 as a horizontal transform kernel and use DST7 as a vertical transform kernel. Alternatively, the decoding apparatus may use DCT8 as a horizontal transform kernel and use DCT8 as a vertical transform kernel.

Meanwhile, when the current block is decoded according to tu_mts_idx, the decoding apparatus may generate the residual block of the current block by inversely transforming the transform block of the current block using the transform kernel selected according to Table 2 and the value of tu_mts_idx obtained from the bitstream. FIG. 18 illustrates a portion of the syntax structure for obtaining encoding information of a TU by parsing, by a decoding apparatus, a bitstream generated by encoding an image by an encoding apparatus according to an embodiment, in the examples of FIGS. 16 and 17.

As described above, the encoding apparatus may include, in the bitstream, tu_mts_idx which is an MTS index parameter indicating the horizontal and vertical transform kernels applied to the luma transform block of a current coding unit. tu_mts_idx may indicate a value for setting the value of trTypeHor and trTypeVer as described above with reference to Table 2.

The encoding apparatus may signal tu_mts_idx to the decoding apparatus through the bitstream only under a specific condition. For example, the encoding apparatus may determine whether tu_mts_idx is signaled based on the prediction mode of the current block and the values of a first flag and a second flag. Here, the first flag may be sps_explicit_mts_intra_enabled_flag which is a parameter indicating tu_mts_idx is present in the intra coding unit syntax. In addition, the second flag may be sps_explicit_mts_inter_enabled_flag which is a parameter indicating whether tu_mts_idx is present in the inter coding unit syntax.

The encoding apparatus may include information indicating whether sps_explicit_mts_intra_enabled_flag and sps_explicit_mts_inter_enabled_flag are transmitted in the bitstream, in order to reduce the number of bits of the bitstream. For example, the encoding apparatus may include third flag information in the bitstream as a parameter indicating whether the two flags are included in the bitstream. For example, the third flag may be sps_mts_enabled_flag.

For example, sps_mts_enabled_flag may indicate whether sps_explicit_mts_intra_enabled_flag and sps_explicit_mts_inter_enabled_flag are present in the RBSP syntax of a sequence parameter set. For example, the value of sps_mts_enabled_flag may be set to 1 to indicate that sps_explicit_mts_intra_enabled_flag and sps_explicit_mts_inter_enabled_flag are present in the RBSP syntax of the sequence parameter sct. Meanwhile, the value of sps_mts_enabled_flag may be set to 0 to indicate that sps_explicit_mts_intra_enabled_flag and sps_explicit_mts_inter_enabled_flag are not present in the RBSP syntax of the sequence parameter set.

In an embodiment, the decoding apparatus may set the value of sps_explicit_mts_intra_enabled_flag to 0, when sps_explicit_mts_intra_enabled_flag is not obtained from the bitstream. In addition, when sps_explicit_mts_intra_enabled_flag is not obtained from the bitstream, the value of sps_explicit_mts_intra_enabled_flag may be set to 0.

This will be described with reference to FIG. 18 again. According to the third if statement 300 shown in FIG. 18 for the syntax of the transform unit, when the prediction mode of the current block is not an intra mode and tu_mts_idx may be present in the inter coding unit syntax or when the prediction mode of the current block is an intra mode and tu_mts_idx may be present in the intra coding unit syntax, the decoding apparatus may obtain a parameter tu_mts_idx from the bitstream.

Meanwhile, when the third if statement 300 is not true, the decoding apparatus does not obtain the parameter tu_mts_idx from the bitstream. In this case, the decoding apparatus may set a predetermined set as the value of tu_mts_idx. For example, when tu_mts_idx is not obtained from the bitstream, the decoding apparatus may set the value of tu_mts_idx to 0. Accordingly, the decoding apparatus may set the value of trTypeHor and trTypeVer to 0 and determine that DCT2 is used as a transform kernel for the current block according to trTypeHor and trTypeVer, as described above with reference to Table 2.

Embodiment 2

Meanwhile, when an image is encoded by performing MTS as described above, compression efficiency is improved in that an optimal transform kernel is found and applied to a transform block. However, when MTS is performed, since a transform kernel is determined for each target block, encoding complexity may be significantly increased. Therefore, the encoding apparatus according to an embodiment may perform transform by selecting any one transform kernel from among a plurality of transform kernels and output an MTS index indicating the selected transform kernel as the bitstream, when the encoding mode of the current block is an inter or intra mode, but may perform transform using a predetermined transform kernel when the encoding mode of the current block is an IBC mode, thereby reducing encoding complexity. In addition, in this case, by using the predetermined transform kernel, the MTS index may not be output as the bitstream.

Figure 19:
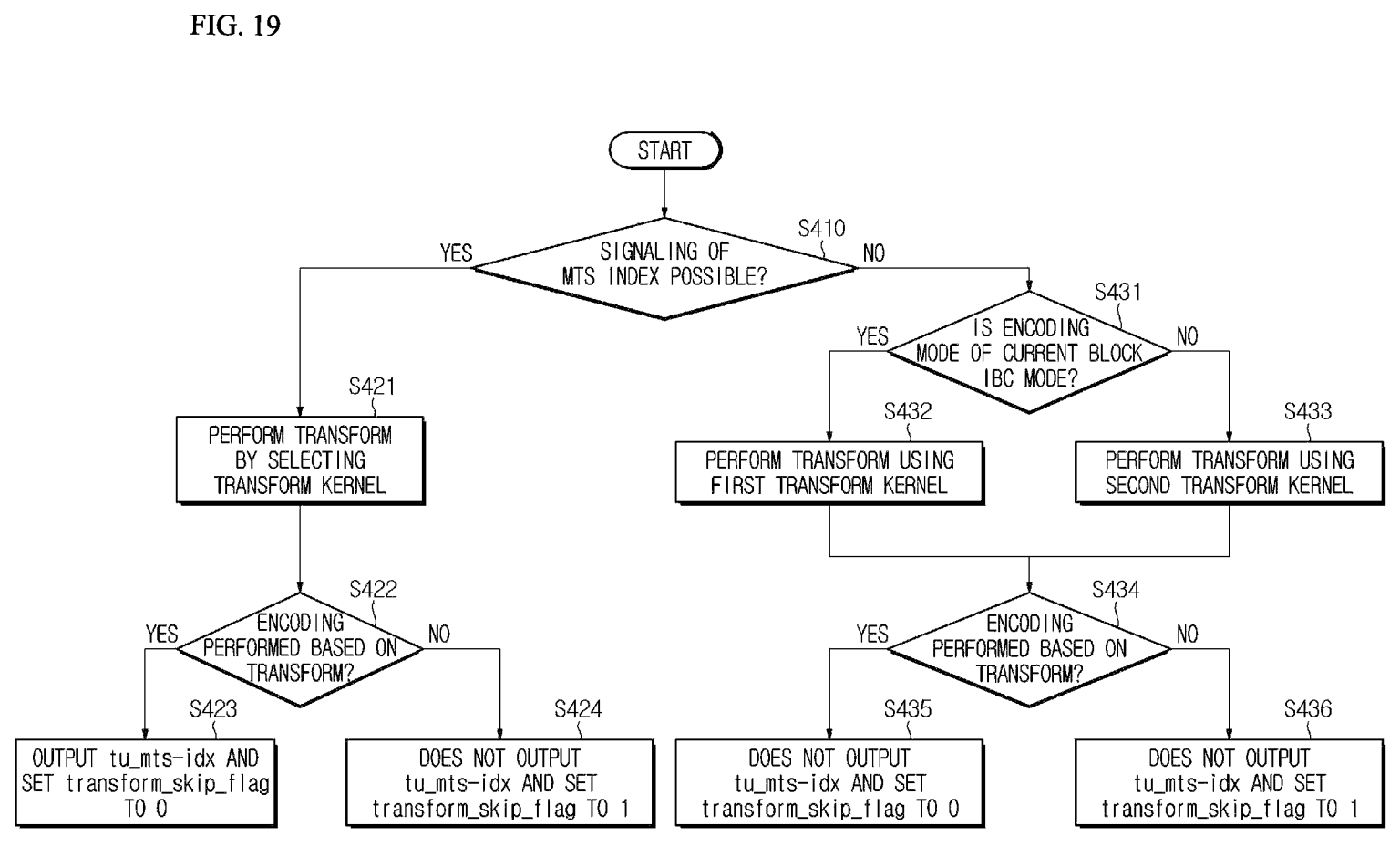

Hereinafter, MTS index signaling of an encoding apparatus according to an embodiment and an inverse transform process of a decoding apparatus accordingly will be described with reference to FIGS. 19 to 22. FIG. 19 is a flowchart illustrating operation of an encoding apparatus according to an embodiment. Operation of the encoding apparatus will be first described with reference to FIG. 19. In FIG. 19, steps S410 to S424 and S434 to S436 correspond to steps S210 to S224 and S232 to S234 of FIG. 16 and thus a detailed description thereof will be omitted. Hereinafter, steps S431 to S433 of FIG. 19 which are different from FIG. 16 will be focused upon.

The encoding apparatus according to an embodiment may determine whether the encoding mode of the current block is an IBC mode (S431), when signaling of the MTS index is not performed (S410). The encoding apparatus may generate a transform block by performing transform of a current residual block using a first transform kernel when the encoding mode of the current block is an IBC mode (S432). In an embodiment, the encoding apparatus may not perform transform by selecting an optimal transform kernel from among a plurality of transform kernels, but may perform transform using a predetermined first transform kernel. For example, the encoding apparatus may use DCT2 as a horizontal transform kernel and use DCT2 as a vertical transform kernel. Alternatively, the encoding apparatus may use DST7 as a horizontal transform kernel and use DST7 as a vertical transform kernel. Alternatively, the encoding apparatus may use DCT8 as a horizontal transform kernel and use DCT8 as a vertical transform kernel.

Meanwhile, the encoding apparatus may generate a transform block by performing transform of the current residual block using a second transform kernel (S433), when the encoding mode of the current block is not an IBC mode. In an embodiment, when the encoding mode of the current block is an inter or intra mode, the encoding apparatus may perform transform using a predetermined second transform kernel. For example, the encoding apparatus may use DCT2 as a horizontal transform kernel and use DCT2 as a vertical transform kernel. Alternatively, the encoding apparatus may use DST7 as a horizontal transform kernel and use DST7 as a vertical transform kernel. Alternatively, the encoding apparatus may use DCT8 as a horizontal transform kernel and use DCT8 as a vertical transform kernel.

The encoding apparatus according to an embodiment may preset a first transform kernel and a second transform kernel as specific transform kernels according to the transform characteristics of the residual block generated in the IBC mode and the transform characteristics of the residual block generated in a mode other than the IBC mode (e.g., inter or intra mode). The encoding apparatus according to an embodiment may equally set the first transform kernel and the second transform kernel. For example, the encoding apparatus may use DCT2 as a horizontal transform kernel and use DCT2 as a vertical transform kernel, for both the second transform kernel and the second transform kernel.

In another embodiment, the encoding apparatus may differently set the first transform kernel and the second transform kernel. For example, the encoding apparatus may use DST7 as a horizontal transform kernel and use DST7 as a vertical transform kernel for the first transform kernel for the IBC mode, and use DCT2 as a horizontal transform kernel and use DCT2 as a vertical transform kernel for the second transform kernel for the prediction mode other than the IBC mode. Next, the encoding apparatus may determine whether to apply transform to encode the current block based on the result of performing transform of the current block using the predetermined transform kernel as described above (S434), and perform processing accordingly. For example, when the current block is encoded based on transform, the encoding apparatus may not output the value of tu_mts_idx as the bitstream and may output, as the bitstream, 0 as the value of transform_skip_flag which is a parameter indicating whether transform is skipped (S435). Meanwhile, when the current block is not encoded based on transform, the encoding apparatus may not output the value of tu_mts_idx as the bitstream and may output, in the bitstream, 1 as the value of transform_skip_flag which is a parameter indicating whether transform is skipped (S436).

Figure 20:
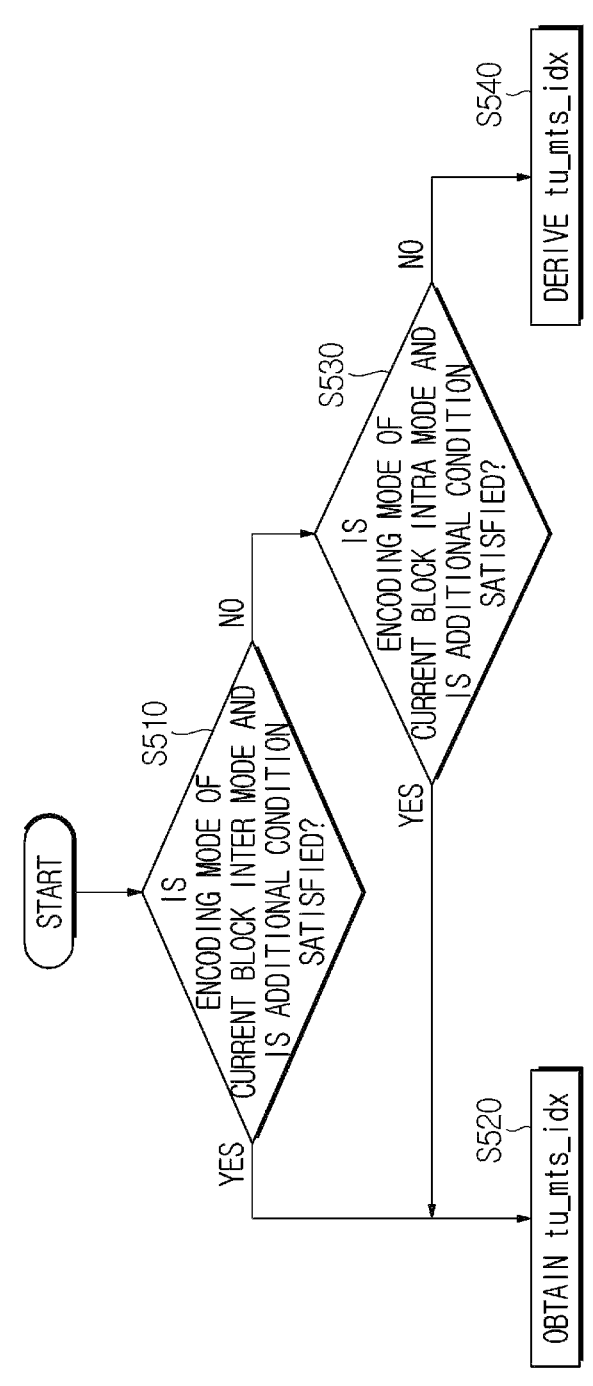

FIG. 20 illustrates a method of determining an MTS index by a decoding apparatus according to an embodiment. The decoding apparatus according to an embodiment may determine whether the encoding mode of the current block is an inter mode and an additional condition is satisfied (S510). Here, the additional condition may be whether the first flag obtained from the bitstream indicates whether tu_mts_idx is included in the bitstream when the current encoding mode is an inter mode. For example, when the encoding mode of the current block is an inter mode and the first flag indicates whether tu_mts_idx is included in the bitstream when the current encoding mode is an inter mode, the decoding apparatus may obtain tu_mts_idx from the bitstream (S520).

Otherwise, the decoding apparatus according to an embodiment may determine whether the encoding mode of the current block is an intra mode and an additional condition is satisfied (S530). Here, the additional condition may be whether the second flag obtained from the bitstream indicates whether tu_mts_idx is included in the bitstream when the current encoding mode is an intra mode. For example, when the encoding mode of the current block is an intra mode and the first flag indicates whether tu_mts_idx is included in the bitstream when the current encoding mode is an intra mode, the decoding apparatus may obtain tu_mts_idx from the bitstream (S520).

Meanwhile, otherwise, the decoding apparatus may derive tu_mts_idx of the current block without obtaining it from the bitstream (S540). Meanwhile, as described with reference to FIG. 17, the determinations of whether the conditions are satisfied in steps S510 and S520 may be performed in a different order.

Hereinafter, a method of deriving tu_mts_idx of a current block by a decoding apparatus without obtaining it from a bitstream will be described in greater detail with reference to FIG. 21. The decoding apparatus according to an embodiment may determine whether the encoding mode of the current block is an IBC mode (S541). The decoding apparatus according to an embodiment may set tu_mts_idx to a first value without obtaining tu_mts_idx from the bitstream, when the encoding mode of the current block is an IBC mode (S542). The decoding apparatus may set tu_mts_idx to a second value without obtaining tu_mts_idx from the bitstream, when the encoding mode of the current block is not an IBC mode (S543).

In the case of the example of Table 2, the decoding apparatus may set the value of tu_mts_idx to a predetermined value among values of 0 to 4. In an embodiment, when the encoding apparatus uses DCT2 as a horizontal transform kernel and uses DCT2 as a vertical transform kernel both in the case where the prediction mode of the current block is an IBC mode and the case where the prediction mode is not an IBC mode, the decoding apparatus may set the value of tu_mts_idx to 0 regardless of whether the encoding mode of the current mode is an IBC mode.

In another embodiment, when the encoding apparatus uses DST7 as a horizontal transform kernel and uses DST7 as a vertical transform kernel in the case where the prediction mode of the current block is an IBC mode, and uses DCT2 as a horizontal transform kernel and uses DCT2 as a vertical transform kernel in the case where the prediction mode of the current block is not an IBC mode, the decoding apparatus may set the value of tu_mts_idx to 0 regardless of whether the prediction mode of the current mode is an IBC mode.

FIG. 22 illustrates a portion of the syntax structure for obtaining encoding information of a TU by parsing, by a decoding apparatus, a bitstream generated by encoding an image by an encoding apparatus according to an embodiment, in performing of the encoding apparatus and the decoding apparatus.

The third if statement 400 of FIG. 22 indicates that a parameter tu_mts_idx is included in a bitstream, when the prediction mode of the current block is an inter mode and tu_mts_idx may be present in the inter coding unit syntax or when the prediction mode of the current block is an intra mode and tu_mts_idx may be present in the intra coding unit syntax. Therefore, the encoding apparatus may output the value of tu_mts_idx as the bitstream when the above conditions are satisfied. The decoding apparatus may obtain the value of tu_mts_idx from the bitstream, when the above conditions are satisfied.

Meanwhile, when the third if statement 400 is not satisfied, the encoding apparatus does not output the value of tu_mts_idx as the bitstream. In addition, the decoding apparatus may not obtain the value of tu_mts_idx from the bitstream. In this case, the decoding apparatus may set a predetermined value as the value of tu_mts_idx. For example, when tu_mts_idx is not obtained from the bitstream, the decoding apparatus may set the value of tu_mts_idx to 0. Accordingly, the decoding apparatus may set the values of trTypeHor and trTypeVer to 0 and determine that DCT2 is used as a transform kernel for the current block according to trTypeHor and trTypeVer, as described above with reference to Table 2.

Meanwhile, when the encoding mode of the current block is IBC, the decoding apparatus may set the value of tu_mts_idx to 1. Accordingly, the decoding apparatus may set the values of trTypeHor and trTypeVer to 1 and determine that DST7 is used as a transform kernel for the current block according to trTypeHor and trTypeVer, as described above with reference to Table 2.

Figure 23:
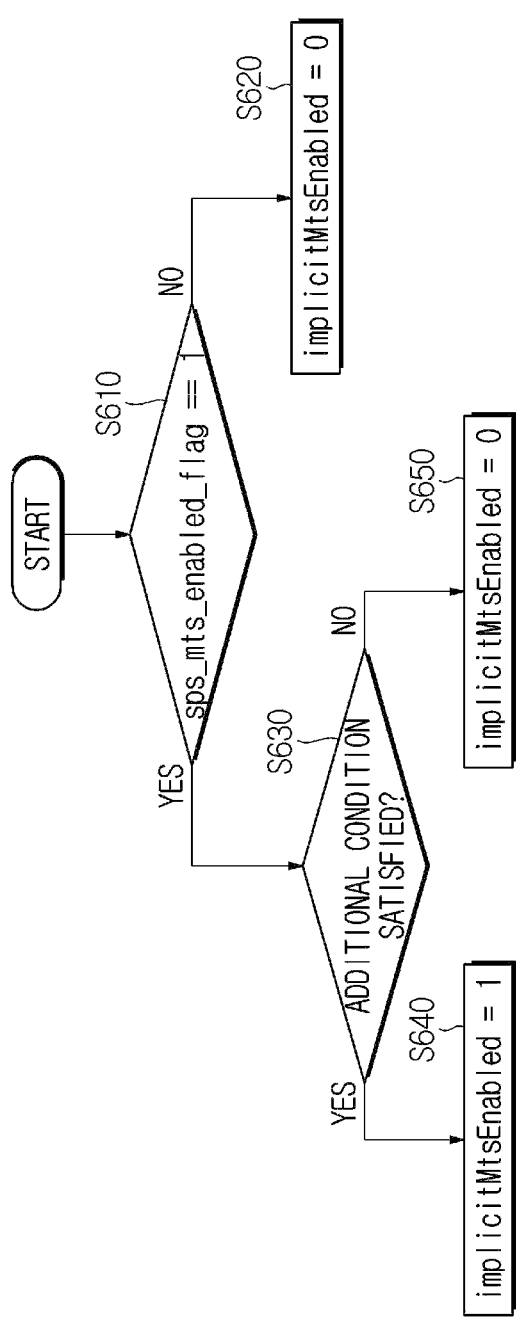
Figure 24:
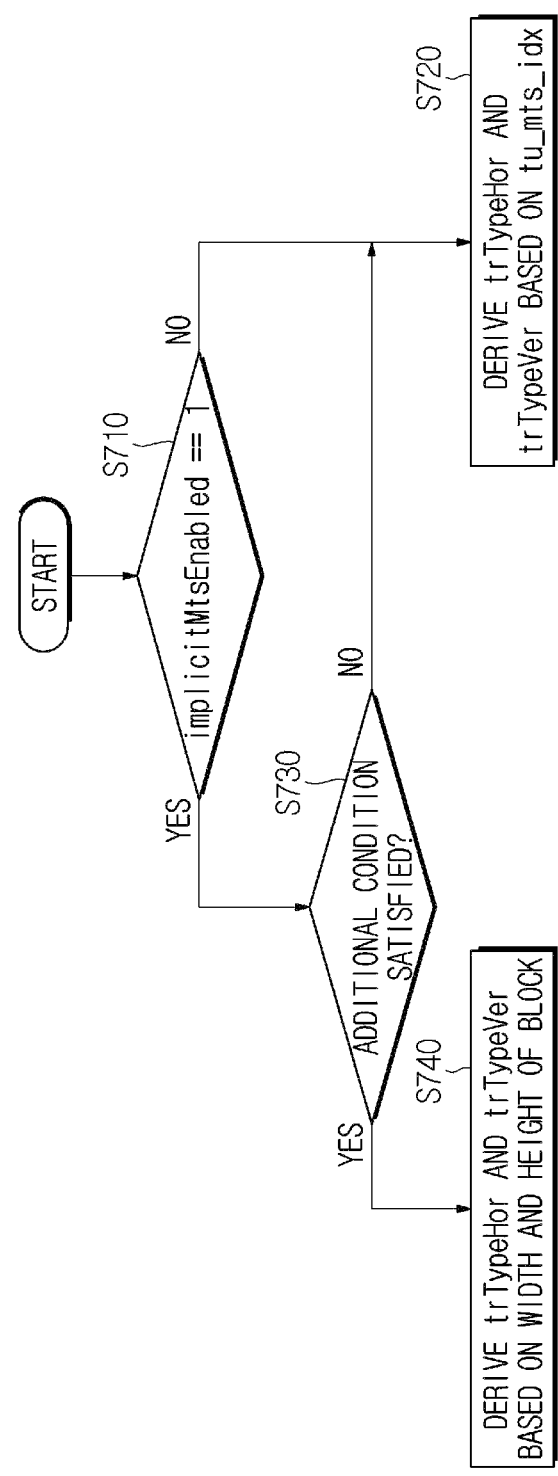

Hereinafter, a method of selecting a transform kernel based on an MTS index by a decoding apparatus according to an embodiment will be described. FIGS. 23 and 24 are flowchart illustrating a method of selecting a transform kernel by a decoding apparatus according to an embodiment. The decoding apparatus according to an embodiment may determine the transform kernel depending on whether to derive a transform kernel index.

Hereinafter, a method of determining whether to derive a transform kernel index by a decoding apparatus will be described with reference to FIG. 23. First, the decoding apparatus according to an embodiment may determine whether to derive an MTS index according to the value of sps_mts_enabled_flag (S610). The decoding apparatus according to an embodiment may determine that the MTS index is not derived when the value of sps_mts_enabled_flag is 0. Therefore, the decoding apparatus may set the value of implicitMtsEnabled which is a parameter indicating whether to derive the MTS index to 0 (S620).

When the value of sps_mts_enabled_flag is 1, the decoding apparatus according to an embodiment may determine additional conditions to determine whether to derive the MTS index (S630). For example, the decoding apparatus may determine whether the value of sps_explicit_mts_intra_enabled_flag is 0, the value of sps_explicit_mts_inter_enabled_flag is 0 and the encoding mode of the current block is an IBC mode (S630). When the additional conditions are satisfied, the decoding apparatus may set the value of implicitMtsEnabled to 1 (S640). Meanwhile, when the additional conditions are satisfied, the decoding apparatus may set the value of implicitMtsEnabled to 0 (S650).

Hereinafter, a method of determining a transform kernel by a decoding apparatus depending on whether to derive a transform kernel index will be described with reference to FIG. 24.

The decoding apparatus according to an embodiment may determine whether to derive the MTS index, depending on whether the value of implicitMtsEnabled is 1 (S710). When the value of implicitMtsEnabled is not 1, the decoding apparatus may determine that the value of the transform kernel index is not derived, and determine a horizontal transform kernel and a vertical transform kernel by setting trTypeHor and trTypeVer according to the value of tu_mts_idx (S720).

Meanwhile, when the value of implicitMtsEnabled is 1, the decoding apparatus may determine a transform kernel by determining additional conditions (S730). For example, the decoding apparatus may select a method of determining a transform kernel, depending on whether the value of is the value implicitMtsEnabled 1, of sps_explicit_mts_intra_enabled_flag is 0, the value of sps_explicit_mts_inter_enabled_flag is 0 and the encoding mode of the current block is an IBC mode (S730).

When the additional conditions are satisfied, the decoding apparatus may determine a horizontal transform kernel and a vertical transform kernel by deriving trTypeHor and trTypeVer according to the width and height of the block (S740). For example, when the width of the current block is greater than or equal to 4, the width of the current block is less than or equal to 16 and the height of the current block is greater than or equal to the width of the current block, the decoding apparatus may determine a horizontal transform kernel, by setting trTypeHor to 1. Meanwhile, otherwise, the decoding apparatus may determine a horizontal transform kernel, by setting trTypeHor to 0.

In addition, when the height of the current block is greater than or equal to 4, the height of the current block is less than or equal to 16 and the width of the current block is greater than or equal to the height of the current block, the decoding apparatus may determine a horizontal transform kernel, by setting trTypeHor to 1. Meanwhile, otherwise, the decoding apparatus may determine a horizontal transform kernel, by setting trTypeHor to 0.

For example, the decoding apparatus may derive trTypeHor and trTypeVer according to the following equations. Here, nTbW denotes the width of the current block, and nTbH denotes the height of the current block.

$$trTypeHor = \qquad\qquad [Equation\ 2]$$
$$(nTbW >= 4\ \&\&\ nTbW <= 16\ \&\&\ nTbW <= nTbH)?1{:}0$$

$$trTypeVer = \qquad\qquad [Equation\ 3]$$
$$(nTbH >= 4\ \&\&\ nTbH <= 16\ \&\&\ nTbH <= nTbW)?1{:}0$$

According to the above equations and Table 2 above, when the value of trTypeHor of the current block is 1, the decoding apparatus may use DST7 as a horizontal transform kernel, and, when the value of trTypeVer is 1, the decoding apparatus may use DST7 as a vertical transform kernel. In addition, when the value of trTypeHor of the current block is 0, the decoding apparatus may use DCT2 as a horizontal transform kernel, and, when the value of trTypeVer is 0, the decoding apparatus may use DCT2 as a vertical transform kernel. By deriving the horizontal transform kernel and the vertical transform kernel for the current block, it is possible to increase coding efficiency.

Meanwhile, when the conditions of step S730 are not satisfied, the decoding apparatus may determine that the value of the transform kernel index is not derived and determine a horizontal transform kernel and a vertical transform kernel by setting trTypeHor and trTypeVer according to the value of tu_mts_idx (S720).

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 25:
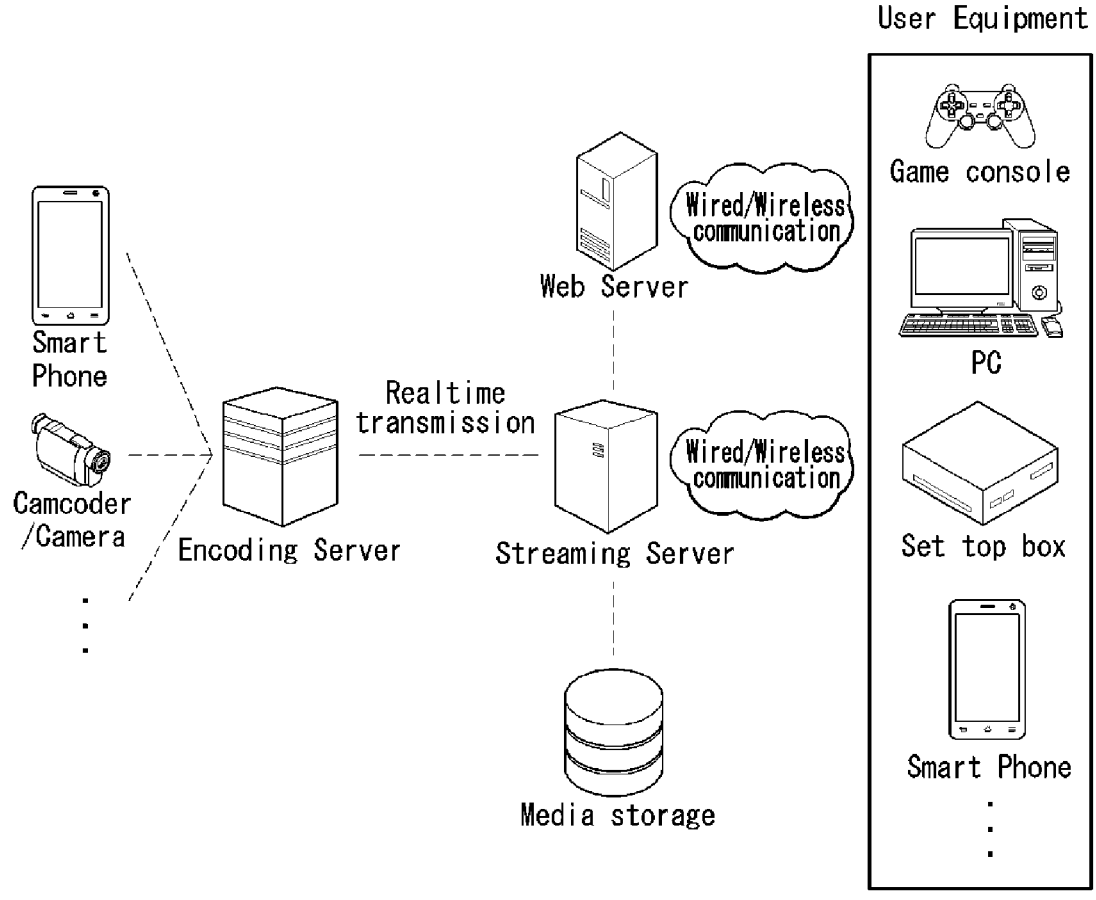
FIG. 25 is a view showing a content streaming system according to an embodiment.

FIG. 25 is a view illustrating a contents streaming system, to which an embodiment of the present disclosure is applicable.

As shown in FIG. 25, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Operation according to the methods of the above-described embodiments may be performed on an apparatus or computer by instructions (e.g., operating systems, applications, firmware, programs, etc.) executable in an apparatus or software executable on an apparatus or computer. Such software or instructions executable in the apparatus may be recorded on a non-transitory computer-readable medium executable through a component of the apparatus or computer. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical recording media such as CD-ROMs or DVD-ROMs; magneto-optical media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated as one or more software modules or vice versa to conduct the processes according to the present disclosure.

Although specific technical idea for encoding and decoding a video or image has been described by the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the technical idea described in the present disclosure shall not be limited to the above-described embodiments, and not only claims described below but also all modifications equally or equivalently to the claims will fall within the scope of the disclosure.

INDUSTRIAL APPLICABILITY

The embodiments of the present disclosure may be used to encode or decode an image.

The invention claimed is:

1. An image decoding apparatus comprising:

at least one processor; and at least one memory comprising instructions stored therein that, when executed by the at least one processor, cause the image decoding apparatus to perform at least:

determining a prediction mode of a current block, based on prediction mode information of the current block obtained from a bitstream;

obtaining a transform coefficient block of the current block from the bitstream;

dequantizing the transform coefficient block to generate a dequantized transform coefficient block;

determining a transform kernel for the dequantized transform coefficient block; and generating a residual block of the current block by performing inverse transform on the dequantized transform coefficient block based on the transform kernel, wherein the transform kernel is determined based on transform kernel index information obtained from the bitstream, wherein the transform kernel index information specifies a combination of a horizontal transform kernel for the transform coefficient block and a vertical transform kernel for the transform coefficient block, wherein, in an instance in which the prediction mode of the current block is an intra block copy (IBC) mode which refers to a block located in a same picture as the current block and decoded before the current block, a value of the transform kernel index information is derived as a predetermined value rather than the transform kernel index information being obtained from the bitstream, regardless of predetermined flag information in the bitstream specifying whether explicit signaling is being performed in the bitstream, and wherein, in an instance in which the prediction mode of the current block is a prediction mode other than the IBC mode, the transform kernel index information is obtained from the bitstream based on the predetermined flag information in the bitstream.

2. The image decoding apparatus of claim 1, wherein, in an instance in which the transform kernel index information is derived as the predetermined value, the predetermined value specifies a predetermined first transform kernel.

3. The image decoding apparatus of claim 2, wherein the predetermined first transform kernel is either discrete cosine transform 2 (DCT2) or discrete cosine transform 7 (DCT7).

4. An image encoding apparatus comprising:

at least one processor; and at least one memory comprising program instructions stored therein that, when executed by the at least one processor, cause the image encoding apparatus to perform at least:

selecting a prediction mode of a current block;

generating a prediction block for the current block based on the selected prediction mode;

generating a residual block for the current block based on the prediction block;

selecting a transform kernel for transforming the residual block based on the prediction mode;

transforming the residual block based on the transform kernel to generate a transform coefficient block;

quantizing the transform coefficient block to generate a quantized transform coefficient block; and encoding the quantized transform coefficient block to generate a bitstream, wherein, in an instance in which the prediction mode of the current block is an intra block copy (IBC) mode which refers to a block located in a same picture as the current block and the block located in the same picture is encoded before the current block is encoded, the bitstream is encoded without including therein transform kernel index information of the transform kernel, regardless of whether predetermined flag information is encoded in the bitstream, wherein the predetermined flag information is configured to specify whether explicit signaling of transform kernel index information is performed via the bitstream, wherein the transform kernel index information is configured to specify a combination of a horizontal transform kernel for the transform coefficient block and a vertical transform kernel for the transform coefficient block, wherein a value of the transform kernel index information is derivable as a predetermined value, and wherein, in an instance in which the prediction mode of the current block is a prediction mode other than the IBC mode, the transform kernel index information of the transform kernel is encoded into the bitstream based on the predetermined flag information.

5. The image encoding apparatus of claim 4, wherein the program instructions stored in the at least one memory, when executed by the at least one processor, cause the image encoding apparatus to perform the transforming the residual block by causing the image encoding apparatus to further perform:

in an instance in which the prediction mode of the current block is the IBC mode, transforming the residual block based on a predetermined transform kernel, wherein the bitstream does not include transform kernel index information of the predetermined transform kernel used for the transforming the residual block.

6. The image encoding apparatus of claim 4, wherein the program instructions stored in the at least one memory, when executed by the at least one processor, further cause the image encoding device to perform:

including, in the bitstream, first flag information and second flag information, wherein the first flag information specifies whether the transform kernel index information for a block encoded in an intra prediction mode is able to be included in the bitstream, wherein the second flag information specifies whether the transform kernel index information for a block encoded in an inter prediction mode is able to be included in the bitstream are included in the bitstream; and in an instance in which the prediction mode of the current block is the IBC mode, transforming the residual block based on a predetermined transform kernel and refraining from including in the bitstream the transform kernel index information of the predetermined transform kernel used for the transforming the residual block, regardless of whether at least one of the first flag information and the second flag information has a second value specifying that the transform kernel index information is able to be included in the bitstream.

7. The image encoding apparatus of claim 6, wherein the program instructions stored in the at least one memory, when executed by the at least one processor, further cause the image encoding device to perform the transforming the residual block by causing the image encoding device to perform:

in an instance in which the prediction mode of the current block is the IBC mode and both the first flag information and the second flag information have a first value specifying that the transform kernel index information is not included in the bitstream, deriving a predetermined transform kernel based at least on a width of the current block and a height of the current block; and transforming the residual block based on the predetermined transform kernel, wherein transform kernel index information of the predetermined transform kernel used for the transforming the residual block is not included in the bitstream.

8. A non-transitory computer-readable storage medium comprising program instructions stored therein that, when executed by at least one processor of an image decoding apparatus, cause the image decoding apparatus to perform an image decoding method, the image decoding method comprising:

determining a prediction mode of a current block, based on prediction mode information of the current block obtained from a bitstream;

obtaining a transform coefficient block of the current block from the bitstream;

dequantizing the transform coefficient block to generate a dequantized transform coefficient block;

determining a transform kernel for the dequantized transform coefficient block; and generating a residual block of the current block by performing inverse transform on the dequantized transform coefficient block based on the transform kernel, wherein the transform kernel is determined based on transform kernel index information obtained from the bitstream, wherein the transform kernel index information specifies a combination of a horizontal transform kernel for the transform coefficient block and a vertical transform kernel for the transform coefficient block, determining that the prediction mode of the current block is an intra block copy (IBC) mode which refers to a block located in a same picture as the current block and decoded before the current block, a value of the transform kernel index information is derived as a predetermined value rather than the transform kernel index information being obtained from the bitstream, regardless of predetermined flag information in the bitstream specifying whether explicit signaling is being performed in the bitstream, and wherein, in an instance in which the prediction mode of the current block is a prediction mode other than the IBC mode, the transform kernel index information is obtained from the bitstream based on the predetermined flag information in the bitstream.

9. The non-transitory computer-readable storage medium of claim 8, wherein, in an instance in which the transform kernel index information is derived as the predetermined value, the predetermined value specifies a predetermined first transform kernel.

10. The non-transitory computer-readable storage medium of claim 9, wherein the predetermined first transform kernel is either discrete cosine transform 2 (DCT2) or discrete cosine transform 7 (DCT7).

11. The non-transitory computer-readable storage medium of claim 8, wherein the determining the transform kernel for the dequantized transform coefficient block comprises deriving the transform kernel of the current block, wherein the deriving the transform kernel of the current block is based on first flag information specifying whether the transform kernel index information for a block encoded in an intra prediction mode is able to be included in the bitstream, wherein the deriving the transform kernel of the current block is further based on second flag information specifying whether the transform kernel index information for a block encoded in an inter prediction mode is able to be included in the bitstream, and wherein the first flag information and the second flag information are obtained from the bitstream.

12. The non-transitory computer-readable storage medium of claim 11, wherein the program instructions stored therein, when executed by the at least one processor, further cause the image decoding apparatus to perform the determining the transform kernel for the dequantized transform coefficient block by causing the image decoding apparatus to perform at least:

in an instance in which the prediction mode of the current block is the IBC mode and both the first flag information and the second flag information comprise or are set to a first value specifying that the transform kernel index information is not included in the bitstream, deriving the transform kernel of the current block based on at least a width of the current block and a height of the current block.

13. The non-transitory computer-readable storage medium of claim 12, wherein the transform kernel of the current block comprises the horizontal transform kernel and the vertical transform kernel, and wherein the program instructions stored in the non-transitory computer-readable storage medium, when executed by the at least one processor of the image decoding apparatus, cause the image decoding apparatus to perform the determining the transform kernel for the dequantized transform coefficient block by causing the image decoding apparatus to perform at least:

determining the horizontal transform kernel of the current block based at least on whether the width of the current block is within a predetermined range and a comparison between the width of the current block and the height of the current block, and determining the vertical transform kernel of the current block based at least on whether the height of the current block is within a predetermined range and a comparison between the width of the current block and the height of the current block.

14. The non-transitory computer-readable storage medium of claim 11, wherein program instructions stored therein, when executed by the at least one processor of the image decoding apparatus, further cause the image decoding apparatus to perform the determining the transform kernel for the dequantized transform coefficient block by causing the image decoding apparatus to perform at least:

in an instance in which the prediction mode of the current block is the IBC mode, deriving the transform kernel index information as the predetermined value instead of obtaining the transform kernel index information from the bitstream, regardless of whether at least one of the first flag information or the second flag information comprises or is set to a second value specifying that the transform kernel index information is able to be included in the bitstream; and deriving the transform kernel of the current block based on the predetermined value of the transform kernel index information.

15. The non-transitory computer-readable storage medium of claim 8, wherein in an instance in which the transform kernel index information is not obtained from the bitstream, the transform kernel index information is derived as the predetermined value, in an instance in which the prediction mode of the current block is the IBC mode, the transform kernel index information is derived as a first value, and in an instance in which the prediction mode of the current block is a prediction mode other than the IBC mode, the transform kernel index information is derived as a second value different from the first value.

16. A non-transitory computer-readable storage medium comprising program instructions stored therein that, when executed by at least one processor of an image encoding apparatus, cause the image encoding apparatus to perform an image encoding method, the image encoding method comprising:

selecting a prediction mode of a current block;

generating a prediction block for the current block based on the selected prediction mode;

generating a residual block for the current block based on the prediction block;

selecting a transform kernel for transforming the residual block based on the prediction mode;

transforming the residual block based on the transform kernel to generate a transform coefficient block;

quantizing the transform coefficient block to generate a quantized transform coefficient block; and encoding the quantized transform coefficient block to generate a bitstream, wherein, in an instance in which the prediction mode of the current block is an intra block copy (IBC) mode which refers to a block located in a same picture as the current block and the block located in the same picture is encoded before the current block is encoded, the bitstream is encoded without including therein transform kernel index information of the transform kernel, regardless of whether predetermined flag information is encoded in the bitstream, wherein the predetermined flag information is configured to specify whether explicit signaling of transform kernel index information is performed via the bitstream, wherein the transform kernel index information is configured to specify a combination of a horizontal transform kernel for the transform coefficient block and a vertical transform kernel for the transform coefficient block, wherein a value of the transform kernel index information is derivable as a predetermined value, and wherein, in an instance in which the prediction mode of the current block is a prediction mode other than the IBC mode, the transform kernel index information of the transform kernel is encoded into the bitstream based on the predetermined flag information.

17. The non-transitory computer-readable storage medium of claim 16, wherein the program instructions stored therein, when executed by the at least one processor of the image encoding apparatus, cause the image encoding apparatus to perform the transforming the residual block by causing the image encoding apparatus to perform at least:

in an instance in which the prediction mode of the current block is the IBC mode, transforming the residual block based on a predetermined transform kernel, wherein the bitstream does not include transform kernel index information of the predetermined transform kernel used for the transforming the residual block.

18. The non-transitory computer-readable storage medium of claim 16, wherein the program instructions stored therein, when executed by the at least one processor of the image encoding device, further cause the image encoding device to perform: including, in the bitstream, first flag information and second flag information, wherein the first flag information specifies whether the transform kernel index information for a block encoded in an intra prediction mode is able to be included in the bitstream, wherein the second flag information specifies whether the transform kernel index information for a block encoded in an inter prediction mode is able to be included in the bitstream are included in the bitstream; and in an instance in which the prediction mode of the current block is the IBC mode, transforming the residual block based on a predetermined transform kernel, regardless of whether at least one of the first flag information and the second flag information has a second value specifying that the transform kernel index information is able to be included in the bitstream, wherein the transform kernel index information of the predetermined transform kernel used for the transforming the residual block is not included in the bitstream.

19. The non-transitory computer-readable storage medium of claim 18, wherein the program instructions stored therein, when executed by the at least one processor of the image encoding device, cause the image encoding device to perform the transforming the residual block by causing the image encoding device to perform at least: in an instance in which the prediction mode of the current block is the IBC mode and both the first flag information and the second flag information have a first value specifying that the transform kernel index information is not included in the bitstream, deriving a predetermined transform kernel based at least on a width of the current block and a height of the current block; and transforming the residual block based on the predetermined transform kernel, wherein the transform kernel index information of the predetermined transform kernel used for the transforming the residual block is not included in the bitstream.

20. A non-transitory computer-readable storage medium comprising program instructions stored therein that, when executed by at least one processor of an apparatus, cause the apparatus to perform at least:

obtaining a bitstream generated by performing at least:

selecting a prediction mode of a current block;

generating a prediction block for the current block based on the selected prediction generating a residual block for the current block based on the prediction block;

selecting a transform kernel for transforming the residual block based on the prediction mode;

transforming the residual block based on the transform kernel to generate a transform coefficient block;

quantizing the transform coefficient block to generate a quantized transform coefficient block; and encoding the quantized transform coefficient block to generate the bitstream, wherein, in an instance in which the prediction mode of the current block is an intra block copy (IBC) mode which refers to a block located in the same picture as the current block and the block located in the same picture is encoded before the current block is encoded, the bitstream is encoded without including therein transform kernel index information of the transform kernel, regardless of the predetermined flag information being encoded in the bitstream, wherein the predetermined flag information is configured to specify whether explicit signaling of transform kernel index information is performed via the bitstream, wherein the transform kernel index information is configured to specify a combination of a horizontal transform kernel for the transform coefficient block and a vertical transform kernel for the transform coefficient block, wherein a value of the transform kernel index information is derivable as a predetermined value, and wherein, in an instance in which the prediction mode of the current block is a prediction mode other than the IBC mode, the transform kernel index information of the transform kernel is encoded into the bitstream based on the predetermined flag information, wherein the program instructions stored in the non-transitory computer-readable storage medium, when executed by the at least one processor, further cause the apparatus to perform:

transmitting the bitstream towards at least one image decoding apparatus.

21. The non-transitory computer-readable storage medium of claim 20, wherein, in an instance in which the prediction mode of the current block is the IBC mode, the transforming the residual block is performed based on a predetermined transform kernel, and the transform kernel index information of the transform kernel used for the transforming the residual block is not included in the bitstream.

22. The non-transitory computer-readable storage medium of claim 20, wherein the bitstream further comprises:

first flag information specifying whether the transform kernel index information for a block encoded in an intra prediction mode is able to be included in the bitstream, and second flag information specifying whether the transform kernel index information for a block encoded in an inter prediction mode is able to be included in the bitstream.

23. The non-transitory computer-readable storage medium of claim 22, wherein, in an instance in which the prediction mode of the current block is the IBC mode, the transforming the residual block is performed based on a predetermined transform kernel, and the transform kernel index information of the predetermined transform kernel used for the transforming the residual block is not included in the bitstream, regardless of whether at least one of the first flag information and the second flag information has a second value specifying that the transform kernel index information is able to be included in the bitstream.

24. The non-transitory computer-readable storage medium of claim 22, wherein, in an instance in which the prediction mode of the current block is the IBC mode and both the first flag information and the second flag information have a first value specifying that the transform kernel index information is not included in the bitstream:

the transforming the residual block is performed based on a predetermined transform kernel, the predetermined transform kernel is derived based at least on a width of the current block and a height of the current block, and transform kernel index information of the predetermined transform kernel used for the transforming the residual block is not included in the bitstream.

\* \* \* \* \*